United States Patent
Koizumi et al.

(10) Patent No.: US 6,987,685 B2
(45) Date of Patent: Jan. 17, 2006

(54) READOUT CIRCUIT, SOLID STATE IMAGE PICKUP DEVICE USING THE SAME CIRCUIT, AND CAMERA SYSTEM USING THE SAME

(75) Inventors: Toru Koizumi, Kanagawa (JP); Masaru Fujimura, Kanagawa (JP); Katsuhito Sakurai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/928,403

(22) Filed: Aug. 30, 2004

(65) Prior Publication Data

US 2005/0052940 A1    Mar. 10, 2005

(30) Foreign Application Priority Data

Sep. 4, 2003    (JP)    ............................. 2003-312899

(51) Int. Cl.
    *G11C 5/06*    (2006.01)
(52) U.S. Cl. .................. 365/63; 365/189.01; 348/241; 358/482
(58) Field of Classification Search .................. 365/63, 365/189.01; 348/241; 250/208.1; 358/482
    See application file for complete search history.

(56) References Cited

U.S. PATENT DOCUMENTS

| | | | |
|---|---|---|---|
| 5,061,979 A | 10/1991 | Kobayashi et al. | ............ 357/30 |
| 5,283,669 A * | 2/1994 | Sakai et al. | .................. 358/482 |
| 5,382,975 A * | 1/1995 | Sakai et al. | .................. 348/241 |
| 5,705,411 A | 1/1998 | Yamanobe et al. | ............ 437/40 |

| | | | |
|---|---|---|---|
| 2003/0011731 A1 | 1/2003 | Yoshida et al. | |
| 2003/0141436 A1 | 7/2003 | Koizumi et al. | |
| 2003/0206234 A1 | 11/2003 | Sakurai et al. | |

FOREIGN PATENT DOCUMENTS

| | | |
|---|---|---|
| JP | 62-067864 | 3/1987 |
| JP | 02-219268 | 8/1990 |
| JP | 02-226766 | 9/1990 |
| JP | 5-37715 | 2/1993 |
| JP | 07-086547 | 3/1995 |
| JP | 08-181821 | 12/1996 |
| JP | 2003-224776 | 8/2003 |

* cited by examiner

*Primary Examiner*—Son T. Dinh
(74) *Attorney, Agent, or Firm*—Fitzpatrick, Cella, Harper & Scinto

(57) ABSTRACT

The present invention is mainly aimed at obtaining excellent sensor output free from periodic fixed pattern noise even if the pieces of holding capacity are converted into blocks, and the specific solution unit is described below. The signal readout unit includes: a line memory; first switches each connected to a holding capacity; a first common signal line comprising eight switches connected together; and second switches for connecting the first common signal line to the second common signal line. The control unit controls opening/closing of both switches. Between the electrode of the second switch and the second common signal line, there is provided outgoing wiring. From the control unit, control wiring a1. . . , b1. . . is connected to the first switch. To each wiring a1. . . , b1. . . , a pair of a positive signal and an anti-signal in which the logical level has been reversed with respect to each other is supplied respectively. Each wiring a1. . . , b1. . . is arranged so as to be line-symmetric with respect to the outgoing wiring.

14 Claims, 18 Drawing Sheets

READOUT CIRCUIT, SOLID STATE IMAGE PICKUP DEVICE USING THE SAME CIRCUIT, AND CAMERA SYSTEM USING THE SAME

BACKGROUND OF THE INVENTION

1. Field of the Invention

The present invention relates to a readout circuit, a solid state image pickup device using the same circuit, and a camera system using the same, and more particularly to a readout circuit for temporarily storing a plurality of output signals from a photoelectric conversion unit and reading out the plurality of output signals stored, and its driving method.

2. Related Background Art

With reference to FIG. 14, the description will be made of a conventional example and its problems.

FIG. 14 shows a view of an equivalent circuit for a solid state image pickup device to be used in a line sensor or an area sensor in a conventional example.

In the solid state image pickup device according to the conventional example shown in FIG. 14, each output from a plurality of pixels 101, (in the example shown in the Figure, pixels of 20 pieces px6 to px25 in total of 5 pieces (5 lines) in a vertical direction, and 4 pieces (4 columns) in a horizontal direction) arranged in a two-dimensional shape are held to a holding capacity 103 constituting a memory unit (holding unit) of a line memory once by the selection switch 102a via a vertical output line 102 provided in common with every line, thereafter signals held to the holding capacity 103 are read out in order via its line selection switch 104a to output to a horizontal common signal line 105, and output has been made by a read common amplifier 107 (105a in the Figure denotes a horizontal common signal line reset switch) Each switch 102a, 104a, 105a in the Figure is constituted by, for example, an nMOS transistor (G denotes a gate electrode; S, a source electrode; and d, a drain electrode).

In this case, output from the holding capacity 103 to the horizontal common signal line 105 is performed by capacity division of parasitic capacity CH (Ch) of a horizontal common signal line consisting of capacity CT (Ct) of the holding capacity 103 and parasitic capacity and the like of the horizontal common signal line 105. In other words, when reset voltage of the horizontal common signal line 105 is assumed to be Vchr and signal voltage of light signal to be outputted from the pixel 101 is assumed to be Vsig, voltage to be held at the holding capacity CT becomes Vsig+Vchr, and voltage V to be outputted to the horizontal common signal line 105 is represented by the following expression.

$$V = \frac{Ct \times (Vsig + Vchr) + Ch \times Vchr}{(Ct + Ch)} = \frac{Ct \times Vsig}{(Ct + Ch)} + Vchr \quad (1)$$

As shown by the above-described expression (1), readout gain of the light signal is given by Ct/(Ct+Ch).

The capacity CH of the horizontal common signal line is constituted by wiring capacity of the wiring and source-drain capacity of a switch to be connected to the wiring.

Because of tendency toward multi-pixels and larger size of the solid state image pickup device in recent years, the source drain capacity is increased, the length of wiring becomes longer and the wiring capacity becomes larger, and the capacity CH of the horizontal common signal line tends to increase. As a result, there has been the problem that when the capacity CH of the horizontal common signal line is large, the readout gain lowers and the S/N ratio is deteriorated.

Also, when the holding capacity CT is made larger in order to secure the S/N ratio, there has been the problem that the area of the holding capacity 103 will become larger to make the chip size larger.

Also, in order to solve these problems, as disclosed in Japanese Patent Application Laid-Open No. 05-037715, which is Japanese Patent official gazette open to public inspection, it has been proposed to provide a plurality of horizontal common signal lines and common readout amplifiers for dividing into each horizontal common signal line for outputting. A number of transistors to be connected to the horizontal common signal lines is reduced, whereby the capacity Ch of the horizontal common signal line is made smaller.

However, there have been problems of an increase in a number of output pins, an increase in power consumption and the like due to the increase in the number of the readout amplifiers.

Also, in order to solve these problems, the present inventor, et al., have already proposed means in which as shown in FIG. 15, every two holding capacity 103, they are made into a block and for every block (in the example shown in the Figure, first block B1, second block B2) there is provided a common switch called "second switch 109" via an intermediate node (common signal line) 112, whereby the capacity CH of the horizontal common signal line is made smaller. In order to control such a switch group, the horizontal scan circuit 104 in FIG. 15 is used, but the following problems have arisen on that occasion.

FIG. 16 shows driving timing of the circuit shown in FIG. 15, and its problems will be described.

In FIG. 16, upon reading out a signal held in the holding capacity CT1 (103) of the block B1, the first switch M11 (108) and the second switch M16 (109) are turned ON to read out the signal via the intermediate node 112, the horizontal common signal line 105 and a read common amplifier 106.

In other words, a horizontal common signal line reset switch 110 is turned ON at timing t1, the horizontal common signal line 105 is reset, the horizontal common signal line reset switch 110 is turned OFF at timing t2, and thereafter, the first switch M11 (108) and the second switch N16 (109) are turned ON at timing t3.

Similarly, on reading out a signal held by the holding capacity CT2 (103), the first switch M11 (108) is turned OFF at timing t4, the horizontal common signal line reset switch 110 is turned ON at timing t5 to reset the horizontal common signal line 105, the horizontal common signal line reset switch 110 is turned OFF at timing t6, and thereafter, in addition to the second switch M16 (109) which is ON at timing t7, the first switch M12 (108) is turned ON. Thereafter, the second switch M16 (109) is turned OFF at timing t8. Hereinafter, signals held by holding capacity CT3, CT4 of the next block for adjoining at similar driving timing will be read out.

At this time, deflection of control line of the first switch M11, M12 (108) and the second switch M16 (109) causes a problem that a difference in level occurs in the output. This cause is as follows.

A general layout for the above-described holding capacity, horizontal common signal line, and horizontal scanning circuit is that they are arranged such that the horizontal common signal line 105 is sandwiched between the holding capacity 103 and the horizontal scanning circuit 104. For this reason, a control line for controlling switches such as the first switch M11 (108) and the second switch M16 (109) is arranged so as to cross the horizontal common signal line 105. Specifically, it is as shown in FIGS. 15 and 16.

Hereinafter, the description will be made while bringing the layout schematic view shown in FIG. 17 into correspondence with the equivalent circuit view shown in FIG. 15. In FIGS. 17 and 18, the first line memory CT101 to CT116 (203) correspond to the holding capacity CT (103) in FIG. 15; the control unit CTL1, CTL2 (204), the horizontal scanning circuit 104 in FIG. 15; the second common signal line 205, the horizontal common signal line 105 in FIG. 15; the first common signal line 212, the intermediate node 112 in FIG. 15; the first switch M101 to M116 (208), the first switch M11 to M14 (108) in FIG. 15; and the second switch M201, M202 (209), the second switch M16, M15 (109) in FIG. 15 respectively. Reference numeral 220 denotes outgoing wiring for connecting between the control unit CTL1, CTL2 (204) and the second switch M201, M202 (209).

Pieces of the holding capacity CT (103) shown in FIG. 15 are converted into blocks every two pieces, whereas FIG. 17 shows an example in which the first line memories CT101 to CT116 (203) corresponding to the holding capacity CT (103) have been converted into blocks every eight pieces of capacity. In the example shown in FIG. 17, the first block B1 and the second block B2 are illustrated from the left side.

In FIG. 17, reference symbols a1 to a16 denote control lines for opening/closing the first switches M101 to M116 (208) connected to the first line memories 203 (holding capacity CT101 to CT116). In FIGS. 17 and 18, control lines for the second switches M201, M202 (209) are not shown. FIG. 18 shows a schematic view for a detailed layout including the first and second holding capacity CT101, CT102 of the first line memory 203 within the first block B1 shown in FIG. 17, and the second switch M201 (209) for selecting the first block B1.

With reference to the above-described FIG. 16, the description will be made of driving timing of circuits shown in FIGS. 17 and 18 and their problems.

In the conventional technique, in order to drive a control electrode of each switch, only positive signals have been supplied.

First, at the timing t1, in a state in which the second switch M201 (second switch M16) has been turned ON, the second common signal line 205 (horizontal common signal line) is reset. At timing t2, the first common signal line 212 (intermediate node) and the second common signal line 205 (horizontal common signal line) enters a floating state. At timing t3, the first switch M101 (first switch M11) is additionally turned ON. At this time, since the first and second common signal lines 212, 205 are floating, a control line a1 for reading out from the holding capacity CT101, the first one from the left of the first line memory 203 is turned ON, whereby the second common signal line 205 is deflected via parasitic capacity Ca1 between the outgoing wiring 220 and the control line a1. At timing t7, a control line a2 for reading out from the holding capacity CT102, the second one from the left of the first line memory 203 is turned ON, whereby the second common signal line 205 is deflected via parasitic capacity Ca2 between the outgoing wiring 220 and the control line a2.

At this time, since the parasitic capacity Ca1 between the outgoing wiring 220 and the control line a1 and the parasitic capacity Ca2 between the outgoing wiring 220 and the control line a2 result from their respective distances La1, La2, they satisfy a relation of Ca1>>Ca2, and also differ in an amount of deflection of output. In fact, since the deflection due to the parasitic capacity Ca2 can be substantially ignored, only the deflection due to the parasitic capacity Ca1 is observed.

As a result, when eight pieces of capacity have been converted into blocks as shown in FIGS. 17, 18, there occurs pattern noise every eight pieces of output=heterogeneity of output. In other words, on reading out signals from the holding capacity CT101, CT109 of the first and ninth ones (the extreme left line of the first block B1, the second block B2) from the left of the first line memory 203 in FIG. 17, there has been a problem that the voltage of the second common signal line 205 changes into high voltage.

Specifically, between the control line a2 and the second common signal line 205, there is overlapping capacity indicated by a portion o in FIG. 16 in addition to the parasitic capacity Ca2. If this capacity is assumed to be Cc, when a logical level of the control signal of the control line a2 changes from L level to H level, that is, when supply voltage=VDD changes in voltage, voltage change $\Delta V_{CH}$ in the second common signal line 205 is represented as the following expression.

$$\Delta V_{CH} \approx VDD \times (Ca2 + Cc \times 2)/CH$$

Accordingly, when the control voltage of the control line ai of i-th (for example, second to eighth from the left) other than the first and ninth ones from the left within the block in FIG. 17 has been caused to change, voltage change $\Delta V_{CH}i$ in the second common signal line 205 is as follows.

$$\Delta V_{CH}i \approx VDD \times (Cai + Cc \times 2)/CH$$

However, Cai denotes parasitic capacity between the control line ai of i-th one from the left within the block, and the outgoing wiring 220 (CH denotes parasitic capacity of the second common signal line).

Also, as described above, Ca1>>Ca2 to Ca8.

Therefore, with respect to output of the holding capacity CT102 to CT108 of the second to the eighth ones from the left within the first block B1, a voltage difference $\Delta V_{CH}$ of several mV develops on the second common signal line 205.

$$\Delta V_{CH} \approx VDD \times Ca1/CH$$

The above-described problem is a level at which a problem is conspicuously posed particularly in the solid state image pickup device. That is, the above-described voltage difference $\Delta V_{CH}$ is at a level of several mV or less. In other words, it becomes a more serious problem in an analog circuit represented by the solid state image pickup device which handles several mV or 1 mV or less than a digital circuit having logical amplitude of several V.

In order to solve these problems, such a conventional technique is conceivable as control lines of switches and horizontal common signal lines are arranged on layers different from each other and between them, another wiring layer is inserted as a shielding layer, and since parasitic capacity of the horizontal common signal line is increased, there arise problems that the capacity division ratio becomes larger so that S/N characteristic is not improved among others.

SUMMARY OF THE INVENTION

Thus, it is an object of the present invention to be able to further capacity division by converting the holding capacity into blocks for obtaining an excellent S/N ratio, to obtain excellent sensor output free from periodic fixed pattern noise, even if converted into blocks and to obtain excellent sensor output free from periodic fixed pattern noise, even if adjustment displacement occurs in the semiconductor manufacturing process.

In order to solve the above-described problems, the present invention uses the following means.

As a first aspect, according to the present invention, there is provided a readout circuit, comprising: a line memory constituted by a plurality of memory units for holding signals; first switches connected to each memory unit of the line memory; a first common signal line comprising a predetermined number of the first switches connected together; and a second switch for connecting the first common signal line to the second signal line; a signal readout unit for selectively reading out signals to be held in each memory unit of the line memory on the second common signal line via the first switch, the first common signal line, and the second switch; and a control unit for controlling opening/closing of the first and second switches, wherein said readout circuit has outgoing wiring to be provided between an electrode of the second switch and the second common signal line, and control wiring for being connected from the control unit to at least either the first switch or the second switch, and wherein the control wiring has positive signal supply wiring and anti-signal supply wiring to which a pair of a positive signal and an anti-signal in which the logical level has been reversed each other is supplied respectively, and the positive signal supply wiring and the anti-signal supply wiring are arranged so as to be line-symmetric with respect to the outgoing wiring.

As a second aspect, according to the present invention, there is provided a readout circuit, comprising: a first line memory constituted by a plurality of memory units for holding signals; first switches connected to each memory unit of the first line memory; a first common signal line comprising a predetermined number of the first switches connected together; and a second switch for connecting the first common signal line to the second signal line; a first signal readout unit for selectively reading out signals to be held in each memory unit of the first line memory on the second common signal line via the first switch, the first common signal line, and the second switch; a second line memory to be constituted by a plurality of memory units for holding signals; a third switch connected to each memory unit of the second line memory; a third common signal line comprising a predetermined number of the third switches connected together; a fourth switch for connecting the third common signal line to a fourth common signal line; a second signal readout unit for selectively reading out signals to be held by each memory unit of the second line memory on the fourth common signal line via the third switch, the third common signal line and the fourth switch; a processing unit for extracting a difference signal between output from the first signal readout unit and output from the second signal readout unit; and a control unit for controlling opening/closing of the first and third switches, wherein said readout circuit has: first outgoing wiring to be provided between the electrode of the second switch and the second common signal line; second outgoing wiring to be provided between the electrode of the fourth switch and the fourth common signal line; and control wiring connected from the control unit to the first and third switches, and the control wiring is arranged at a position to become line-symmetric with respect to a center line between the first outgoing wiring and the second outgoing wiring.

As a third aspect, according to the present invention, there is provided a solid state image pickup device, comprising: a light receiving unit comprised of a plurality of pixels; a line memory to be constituted by a plurality of memory units for holding once signals from each of the above-described pixels; and a readout circuit for selectively reading out signals held by each memory unit of the line memory, wherein the readout circuit has: a first switch connected to each memory unit of the line memory; a first common signal line comprising a predetermined number of the first switches connected together; a second switch for connecting the first common signal line to the second common signal line; a signal readout unit for selectively reading out signals to be held by each memory unit of the first line memory on the second common signal line via the first switch, the first common signal line, and the second switch; a control unit for controlling opening/closing of the first and second switches; outgoing wiring provided between the electrode of the second switch and the second common signal line; and control wiring to be connected to at least either the first or second switch from the control unit, and wherein the control wiring has positive signal supply wiring and anti-signal supply wiring to which a pair of a positive signal and an anti-signal in which the logical level has been reversed each other is supplied respectively, and the positive signal supply wiring and the anti-signal supply wiring are arranged so as to be line-symmetric with respect to the outgoing wiring.

As a fourth aspect, according to the present invention, there is provided a solid state image pickup device, comprising: a light receiving unit comprised of a plurality of pixels; a line memory to be constituted by a plurality of memory units for holding once signals from each of the above-described pixels; and a readout circuit for reading out signals held by each memory unit of the line memory, wherein the readout circuit has: a first line memory to be, of the line memories, arranged in a predetermined place; a first switch connected to each memory unit of the first line memory; a first common signal line comprising a predetermined number of the first switches connected together; a second switch for connecting the first common signal line to the second common signal line; a first signal readout unit for selectively reading out signals to be held by each memory unit of the first line memory on the second common signal line via the first switch, the first common signal line, and the second switch; second line memories to be, of the line memories, alternately arranged in places adjacent to the first line memory; third switches connected to each memory unit of the second line memory; a third common signal line comprising a predetermined number of the third switches connected together; a fourth switch for connecting the third common signal line to the fourth common signal line; a second signal readout unit for selectively reading out signals to be held by each memory unit of the second line memory on the fourth common signal line via the third switch, the third common signal line, and the fourth switch; a control unit for controlling opening/closing of the first and third switches; first outgoing wiring provided between the electrode of the second switch and the second common signal line; second outgoing wiring provided between the electrode of the fourth switch and the fourth common signal line; and control wiring to be connected from the control unit to the first and third switches, and the control wiring is arranged at a position to become line-symmetric with respect to a center line between the first outgoing wiring and the second outgoing wiring.

As a fifth aspect, according to the present invention, there is provided a readout circuit, comprising: a signal holding unit composed of a plurality of signal holding cells; common wiring for reading out signals from the signal holding unit; and a partial common line to be shared by two or more of the signal holding cells, in which a readout cell for handling the partial common line as a unit is constituted, and the readout cell has hierarchical structure composed of at least one or more hierarchies, wherein the readout circuit has outgoing wiring for reading out on a common line in a upper layer from a common line in a lower layer, and control wiring adjacent to the outgoing wiring, and wherein the control wiring has positive signal supply wiring and anti-signal supply wiring to which a pair of a positive signal and an anti-signal in which the logical level has been reversed each other is supplied respectively, and the positive signal supply wiring and the anti-signal supply wiring are arranged so as to be line-symmetric with respect to the outgoing wiring.

According to the present invention, it is possible to improve further capacity division by converting the holding capacity into blocks for obtaining an excellent S/N ratio, to obtain excellent sensor output free from periodic fixed pattern noise, even if converted into blocks and to obtain excellent sensor output free from periodic fixed pattern noise, even if adjustment displacement occurs in the semiconductor manufacturing process.

DESCRIPTION OF THE PREFERRED EMBODIMENTS

Hereinafter, with reference to FIGS. 1 to 3, the description will be made of the best mode for carrying out a readout circuit and a solid state image pickup device according to the present invention and a camera system using the same. In this respect, component elements identical to those in the above-described conventional examples (FIGS. 17 and 18) are designated by the identical reference numbers, and the description thereof will be simplified or omitted.

FIRST EXAMPLE

Figure 1:
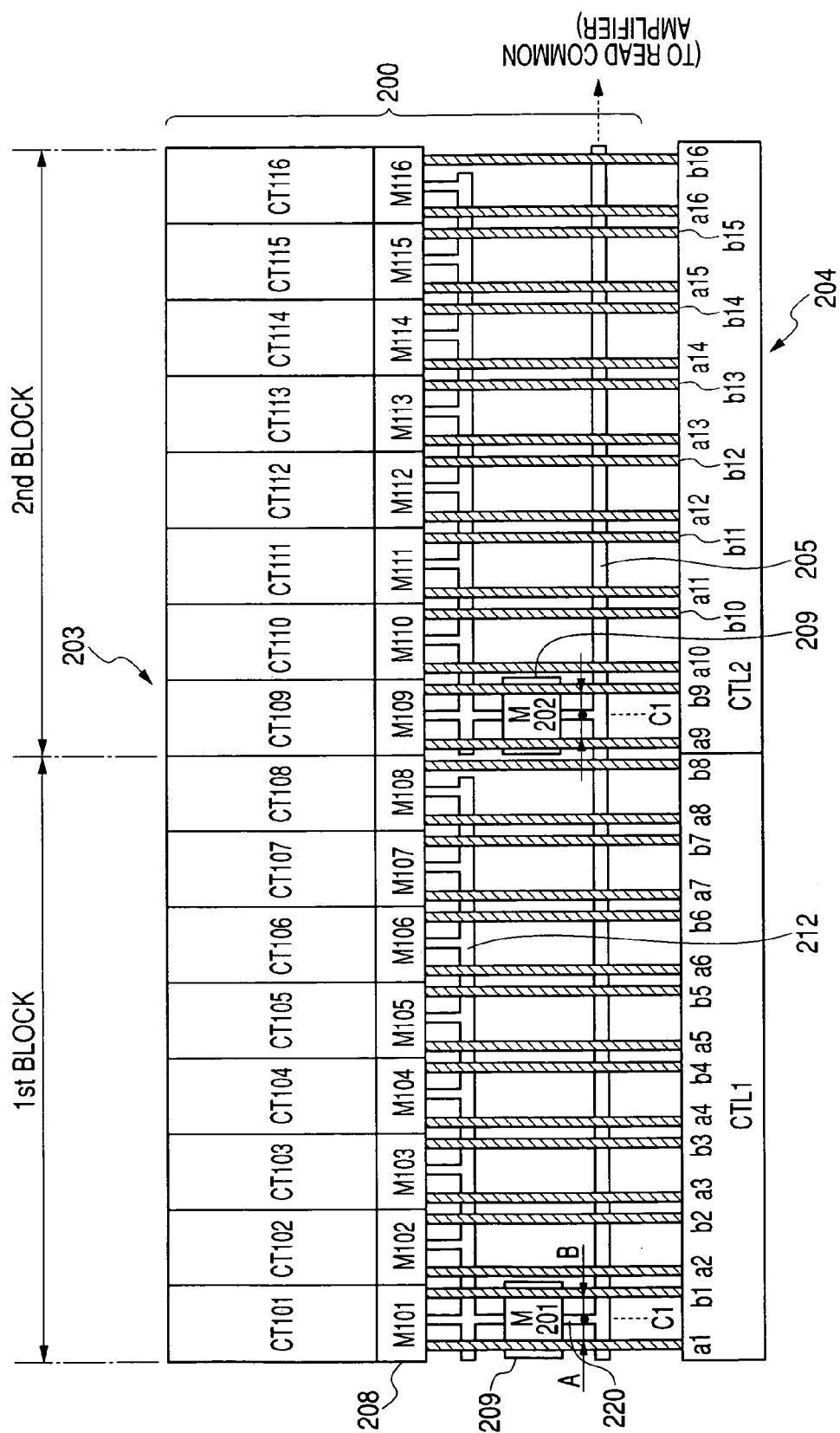
FIG. 1 is a layout schematic view showing a readout circuit according to an example 1 of the present invention.
Figure 2:
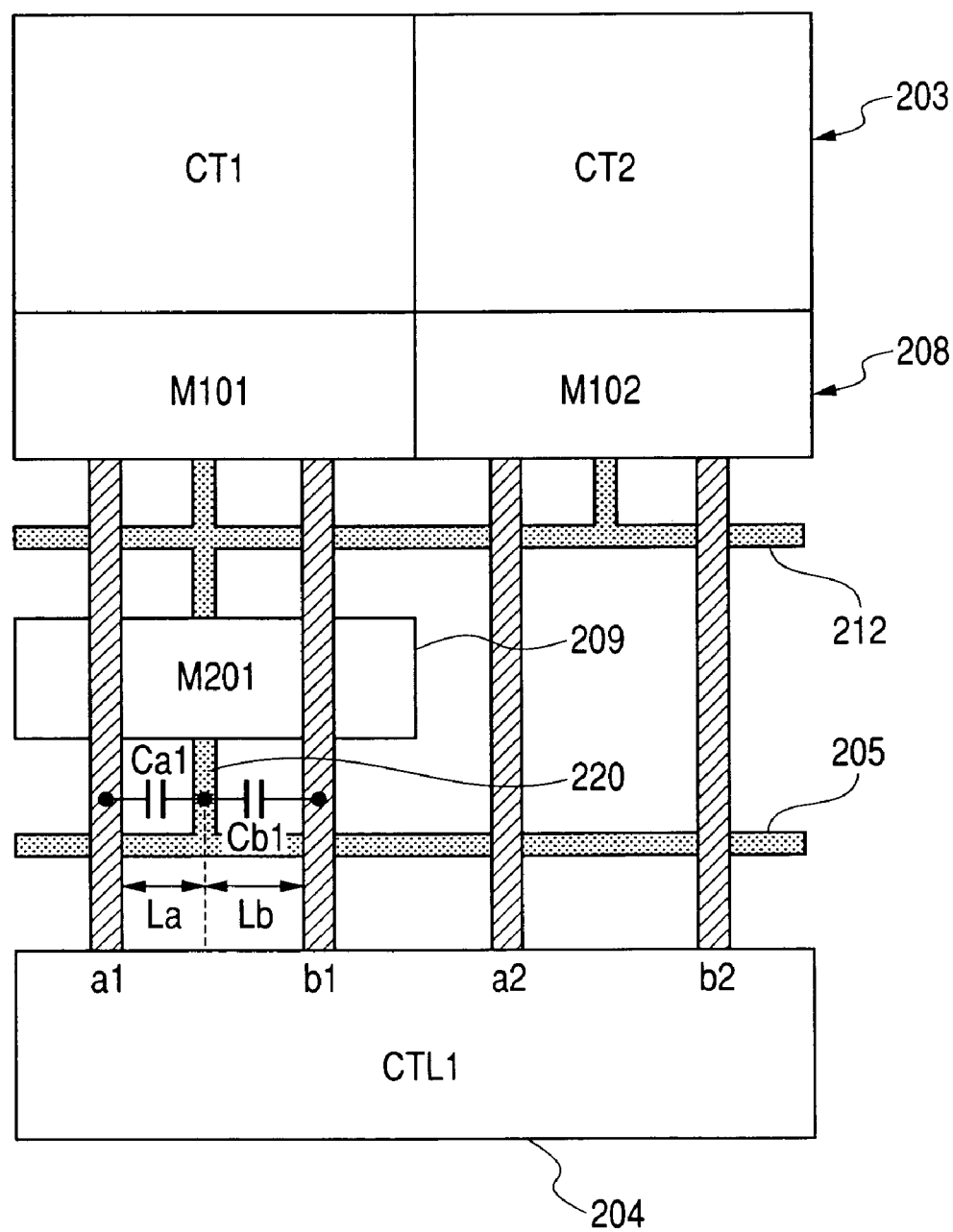
FIG. 2 is a layout schematic view showing the details of FIG. 1.

With reference to FIGS. 1 and 2, the present embodiment will be described.

Figure 17:
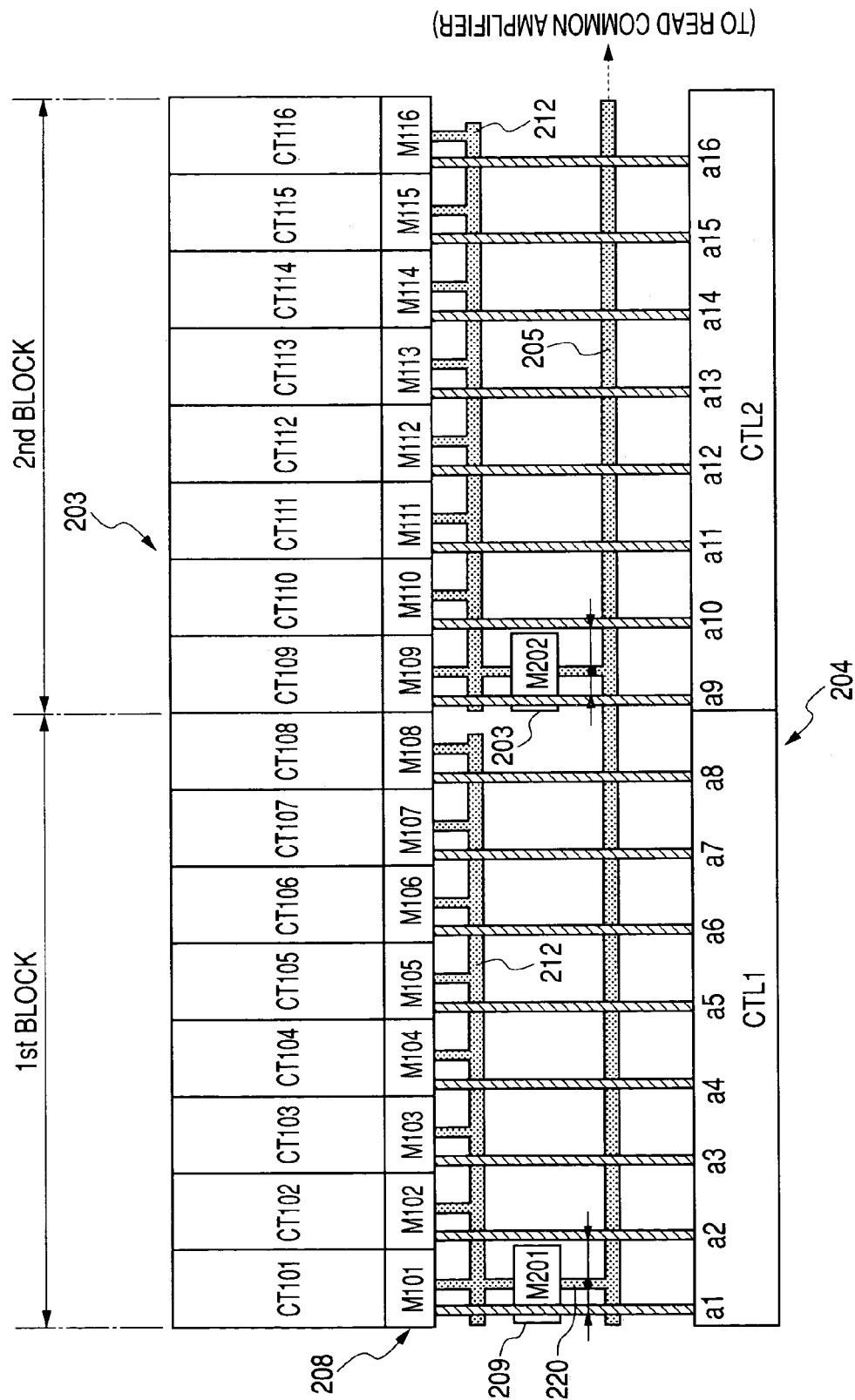
FIG. 17 is a layout schematic view showing a readout circuit converted into blocks of the prior art.
Figure 18:
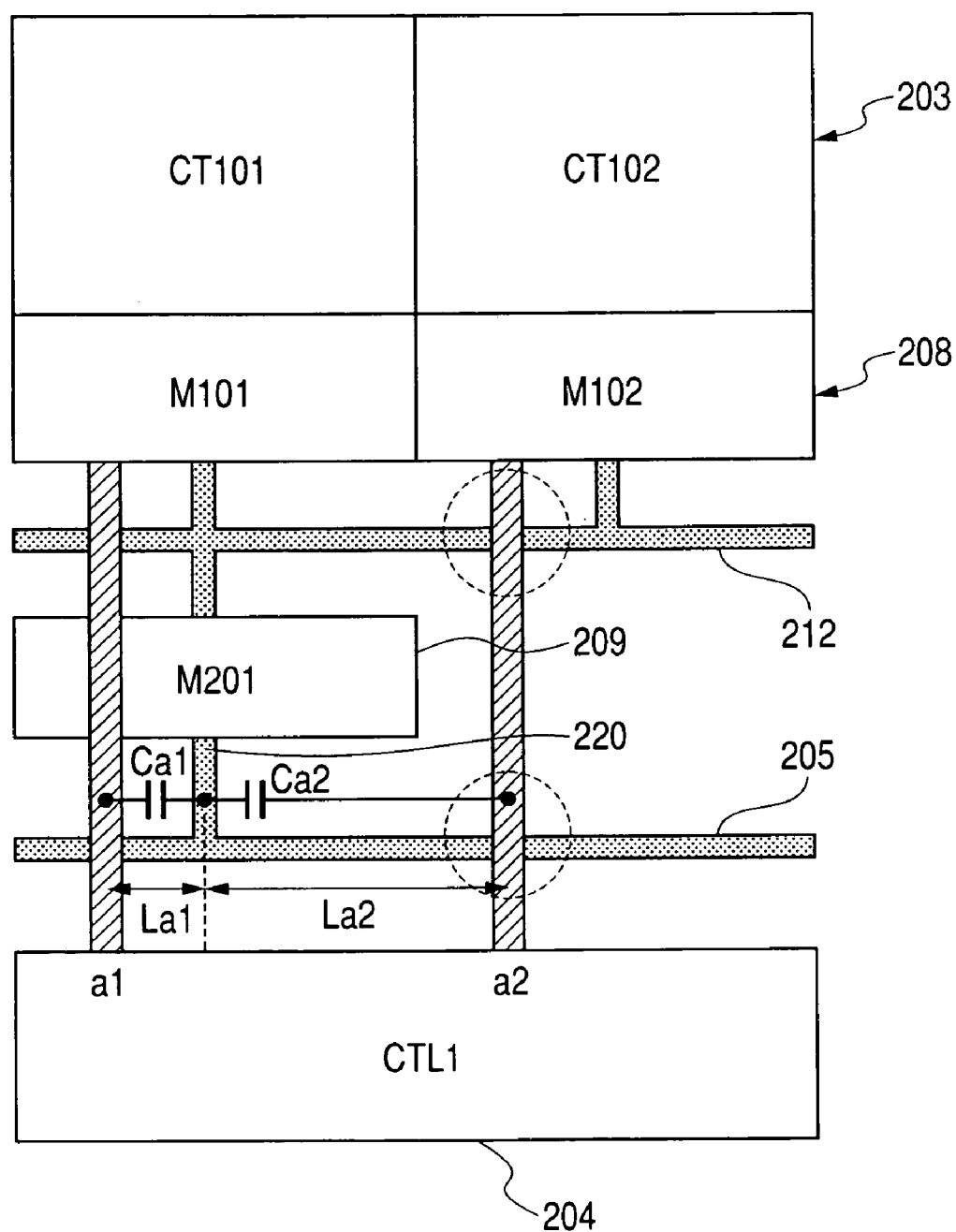
FIG. 18 is a layout schematic view showing the details of FIG. 17.

The present example is an example in which eight pieces of holding capacity have been used in a readout circuit obtained by blocking the line memory as one block as in the case of the conventional example shown in the above-described FIGS. 17, 18. FIG. 1 is a layout schematic view showing two blocks (first block B1, second block B2), and FIG. 2 is a view showing one portion (first column, second column from the left column) within one block (first block B1) in detail.

The readout circuit of the solid state image pickup device shown in FIGS. 1 and 2 has a signal readout unit 200 and a control unit 204. Among them, the signal readout unit 200 includes: a line memory 203 to be constructed by a plurality of holding capacity (memory units) CT101 to CT116 for holding signals; first switches M101 to M116 (208) to be connected to each holding capacity CT101 to CT116; first switches M101 to M116 (208) to be connected to each holding capacity thereof CT101 to CT116; a first common signal line 212 to which a predetermined number (8 pieces in the example in the Figure) of first switches M101 to M116 (208) are connected every the block; and second switches (block selection switches) M201, M202 (209) for connecting the first common signal line 212 to the second common signal line 205 every the block. Between the electrode of the second switches M201, M202 (209) and the second common signal line 205, there is provided outgoing wiring (block outgoing wiring) 220.

In this structure, the signal readout unit 200 reads out signals to be held by each holding capacity CT101 to CT116 of the line memory 203 on the second common signal line 205 via the first switch M101 to M116 (208), the first common signal line 212 and the second switches M201, M202 (209).

In the control unit 204, in the example shown in the Figure, the first control unit CTL1 is allocated to the first block B1, and the second control unit CTL2 is allocated to the second block B2 in respect of the function respectively. The first control unit CTL1 controls opening/closing of the first switches M101 to M108 (208) and the second switch M201 (209) which are to be allocated to the first block B1, and the second control unit CTL2 controls opening/closing of the first switches M109 to M116 (208) and the second switch M202 (209) which are to be allocated to the second block B2. In this case, from the control unit 204, control wiring is connected to the first switches M101 to M116

(208). In this respect, control wiring to be connected to the second switches M201, M202 (209) from the control unit 204 is not shown.

The control wiring has positive signal supply wiring a1 to a16 and anti-signal supply wiring b1 to b16 to which a pair of a positive signal and an anti-signal in which the logical level has been reversed each other is supplied respectively. The positive signal supply wiring a1 to a16 and the anti-signal supply wiring b1 to b16 are arranged so as to be line-symmetric with respect to the outgoing wiring 220.

In other words, in the present example, as the control wiring for controlling the first switches M101 to M116 (208), in addition to the control lines (positive signal supply wiring) a1 to a16 similar to the conventional one, the control lines (anti-signal supply wiring) b1 to b16 to which the anti-signal indicating an opposite logical level to the positive signal to be supplied to the control lines a1 to a8 is supplied are arranged in a pair to each other. The control lines a1, b1 which make a pair are arranged such that distances to the outgoing wiring 220 La, Lb are as equal as La=Lb, in other words, so as to be line-symmetric with respect to the outgoing wiring 220 as shown in FIG. 2. In this respect, a concrete circuit example for the first switches M101 to M116 (208) and the control lines a1 to a16, b1 to b16 has shown in FIG. 10 to be described later.

Thereby, when the logical level of the positive signal to be supplied to the control line a1 (positive signal supply wiring) changes from L level to H level, the outgoing wiring 220 is deflected at high voltage via parasitic capacity Ca1 occurring between the control line a1 and the outgoing wiring 220. In contrast to it, since the logical level of the anti-signal to be supplied to the control line b1 (anti-signal supply wiring) changes from H level to L level, at this time, the outgoing wiring 220 is deflected at low voltage via parasitic capacity Cb1 occurring between the control line b1 and the outgoing wiring 220, and these two voltage changes are added to each other. In other words, voltage change $\Delta V_{CH}$ in the second common signal line 205 is represented by the following expression.

$$\Delta V_{CH} \approx VDD \times Ca1/CH - VDD \times Cb1/CH \approx 0 \text{ mV},$$

where VDD denotes supply voltage; and CH, parasitic capacity of the second common signal line.

Accordingly, in the present example, in a readout circuit converted into blocks to be connected to the common signal line every the block, the voltage change $\Delta V_{CH}$ (difference in level of output) which has been conventionally about 2 mV, becomes 0.1 mV or less, which has been restricted to 1/20 or less as compared with the conventional one. As a result, the periodic fixed pattern noise which occurs for each block in such a readout circuit converted into blocks as explained in the conventional example has disappeared.

In this respect, the present example also shows that it is also applicable when reading out a common signal line provided on a higher hierarchy further via the switch and the outgoing wiring without connecting any amplifier to the second common signal line.

Figure 3:
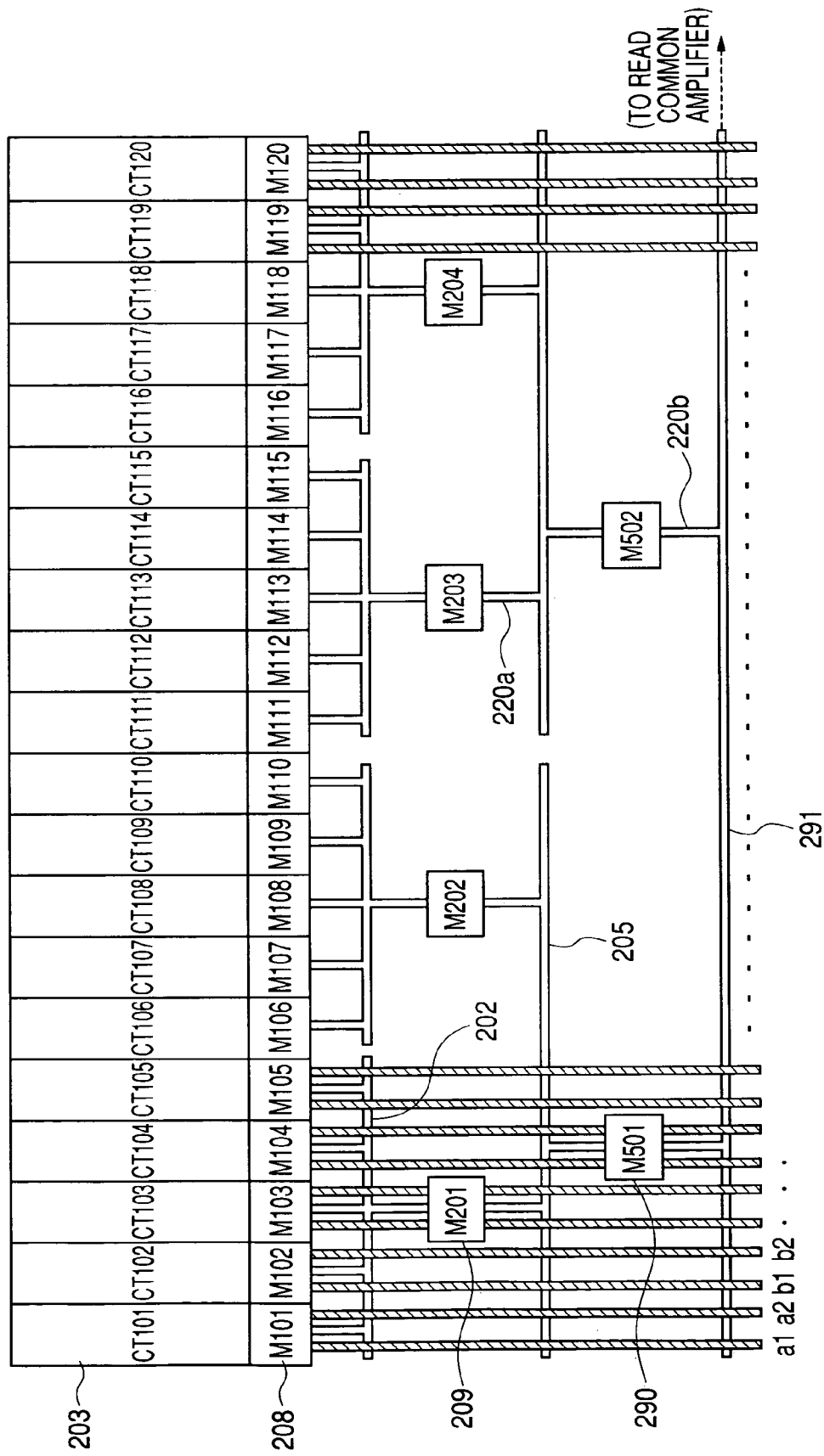
FIG. 3 is a layout schematic view showing the readout circuit which has been hierarchically converted into blocks.

Specifically, FIG. 3 shows a schematic circuit view. In this example, in addition to the first switches M101 to M120 (208) to be connected to the holding capacity CT101 to CT120 of each line memory 203 similar to the foregoing, the first common signal line 212, the second switch (209), the first outgoing wiring 220a, the second common signal line 205, and control lines a1, b1 ... to be connected to the first switches M101 to M120 (208), there is provided a third common signal line 291 to be connected to the second common signal line 205 via the third switches M501, M502 (290) and the second outgoing wiring 220b, and this third common signal line 291 is connected to a read common amplifier (not shown). Even at this time, the control lines a1, b1 ... are arranged so as to be line-symmetric with respect to the first outgoing line 220a and the second outgoing line 220b, whereby the pattern noise could be restricted. As a result, even when blocking has been performed hierarchically, by arranging the outgoing wiring and the control wiring as in the case of the present example, the difference in level of output could be restricted.

In other words, this readout circuit has: a line memory (signal holding unit) composed of a plurality of signal holding cells; second common signal line (common wiring) for reading out signals from the signal holding unit; and a first common signal line (partial common line) to be shared by two or more of the signal holding cells, in which a readout cell for handling the first common signal line as a unit is constituted, and the readout cell has a hierarchical structure composed of at least one or more hierarchies, wherein the readout circuit has outgoing wiring for reading out on a common line in an upper layer from a common line in an lower layer, and control wiring adjacent to the outgoing wiring, and wherein the control wiring has positive signal supply wiring and anti-signal supply wiring to which a pair of a positive signal and an anti-signal in which the logical level has been reversed with respect to each other is supplied respectively, and the positive signal supply wiring and the anti-signal supply wiring are arranged so as to be line-symmetric with respect to the outgoing wiring.

Also, it goes without saying that the readout circuit of the present example is applicable to such a two-dimensional solid state image pickup device and line sensor as described in FIG. 9 later.

SECOND EXAMPLE

Since the present example is of the structure in which 8 pieces of capacity similar to the first example shown in FIGS. 1, 2 have been converted into blocks, the description will be made with reference to the same Figures. The present example is different from the first example in that each wiring has been arranged in the following wiring layer.

In other words, in the readout circuit according to the present example, the control lines a1 to a16, b1 to b16 (positive signal supply wiring, anti-signal supply wiring) which make a pair, and the outgoing wiring 220 are wired with a first metal, and the first and second common signal lines 212, 205 are wired with a second metal. In other words, wiring 212, 205 extending in the lateral (horizontal) direction in the Figure is wired with the same wiring layer (second metal), and wiring a1 to a16, b1 to b16 and 220 extending in the vertical (perpendicular) direction is wired with the same wiring layer (first metal) respectively.

As a result, as regards respective distances La, Lb (La=Lb) of the above-described control lines a1, b1 which make a pair with respect to the outgoing wiring 220, since a difference between both distances La, Lb due to adjustment displacement in each wiring layer in the semiconductor manufacturing process does not occur, parasitic capacity Ca1 occurring between the control line a1 and the outgoing wiring 220 and parasitic capacity Cb1 occurring between the control line b1 and the outgoing wiring 220 completely coincide with each other.

In other words, voltage change $\Delta V_{CH}$ in the second common signal line 205 is represented by the following expression.

$$\Delta V_{CH} \approx VDD \times Ca1/CH - VDD \times Cb1/CH = 0 \text{ mV}$$

Accordingly, in the present example, the voltage change $\Delta V_{CH}$ (difference in level of output) which has been conventionally about 2 mV, has become the measurement limit of 0.05 mV or less.

Also, it goes without saying that the readout circuit of the present example is also applicable to such a two-dimensional solid state image pickup device and line sensor as described in FIG. 7 later.

THIRD EXAMPLE

With reference to FIGS. 4, 5, 6 and 7, the present example will be described.

The present example is an example in which 8 pieces of holding capacity have been converted into one block, in which line memories constituting one block are further allocated to first and second line memories which are arranged adjacent alternately for each column and which has been used in the readout circuit for obtaining a difference signal between a signal held in first line memories adjacent to each other and a signal held by the second line memory. This readout circuit is suitable for the two-dimensional solid state image pickup device, the first line memory holds optical signal and noise signal, and the second line memory holds noise signal, and the difference output has been outputted. In this case, the noise signal is reset noise when the OFFSET component of the amplifier or an input terminal thereof is reset in the amplifier type solid state image pickup device called a CMOS sensor.

Figure 4:
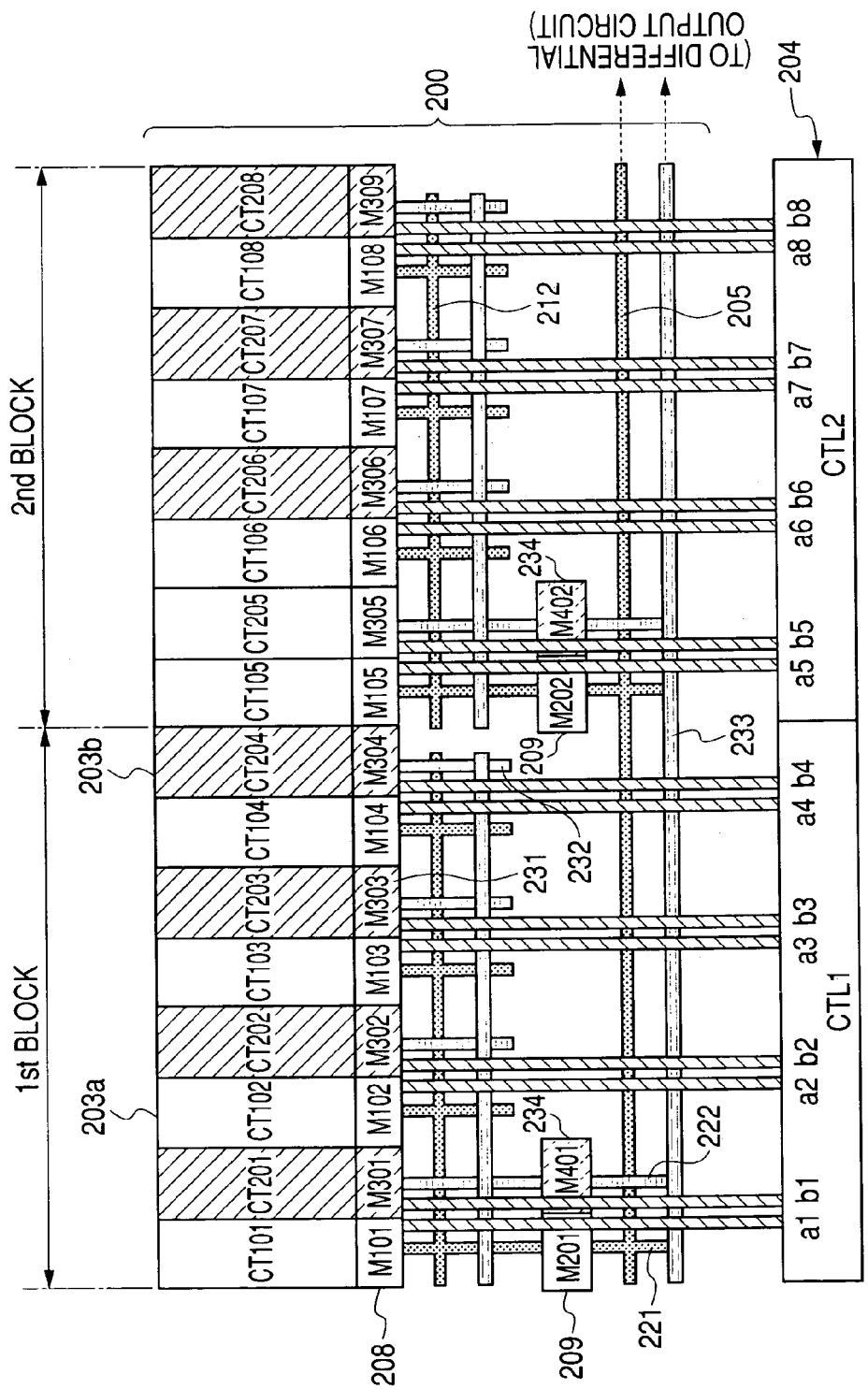
FIG. 4 is a layout schematic view showing the readout circuit according to a third example of the present invention.
Figure 5:
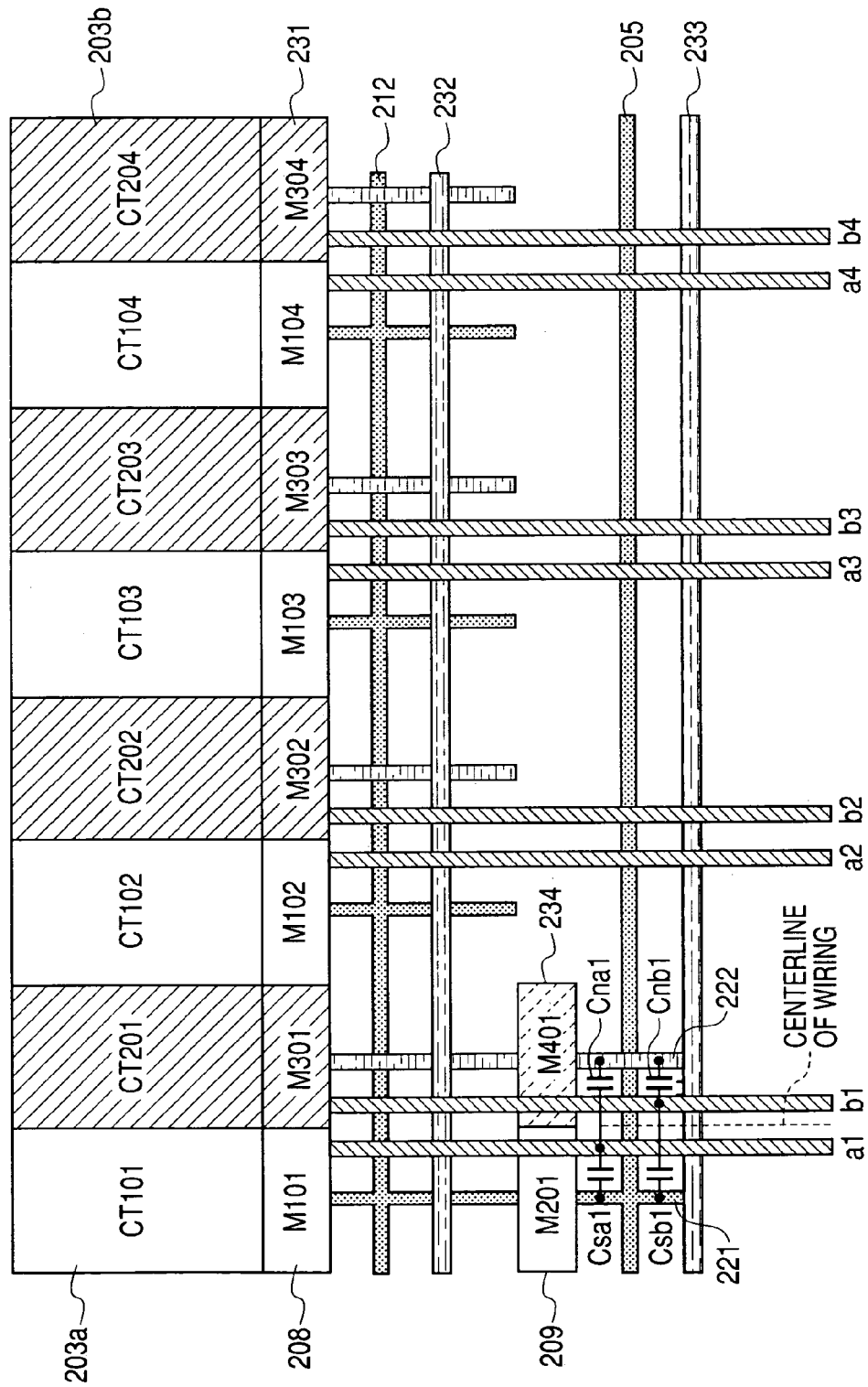
FIG. 5 is a layout schematic view showing the details of FIG. 4.
Figure 6:
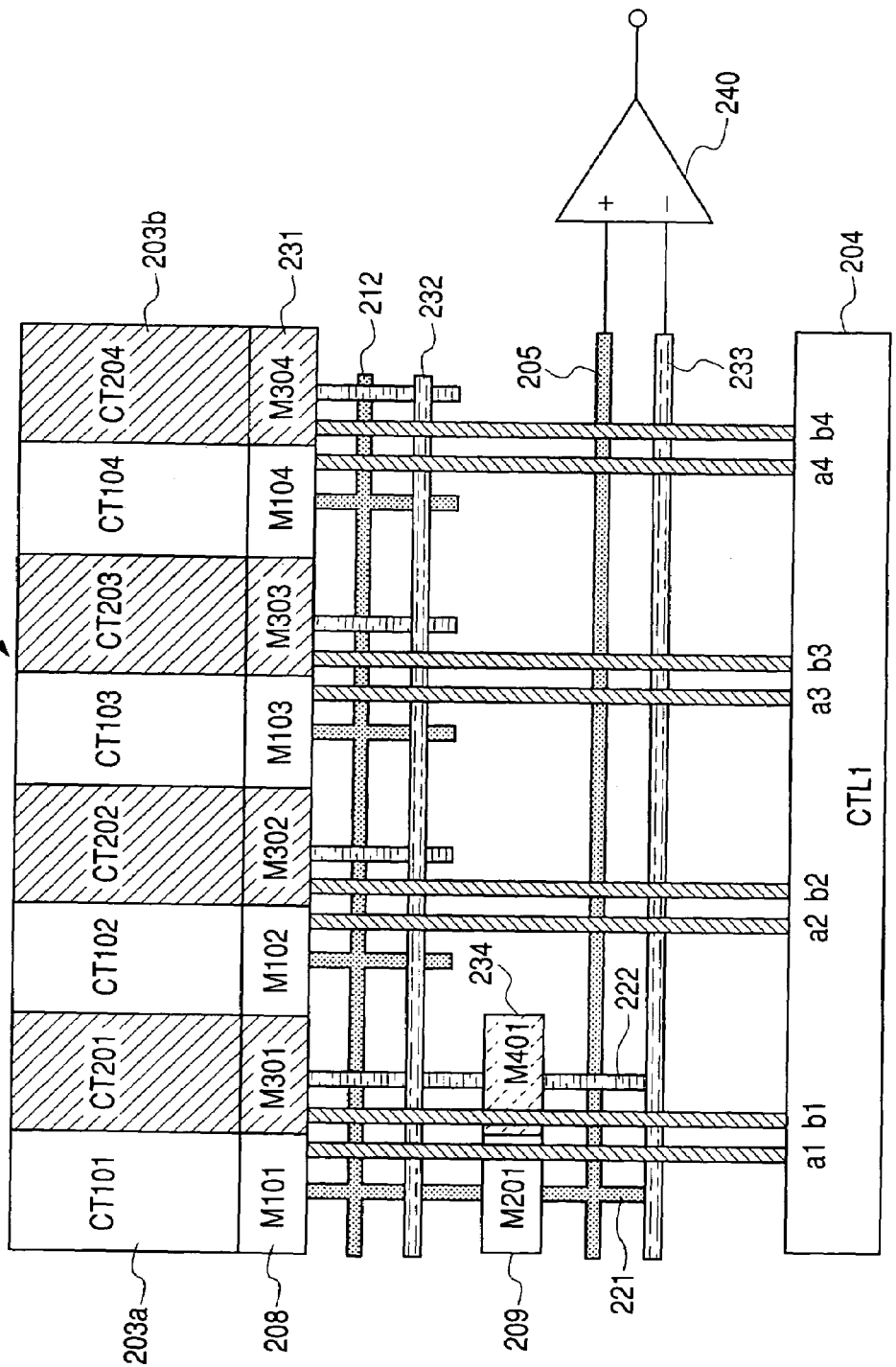
FIG. 6 is a connection diagram showing a connection state between the common signal line and the difference output circuit in FIG. 4.
Figure 7:
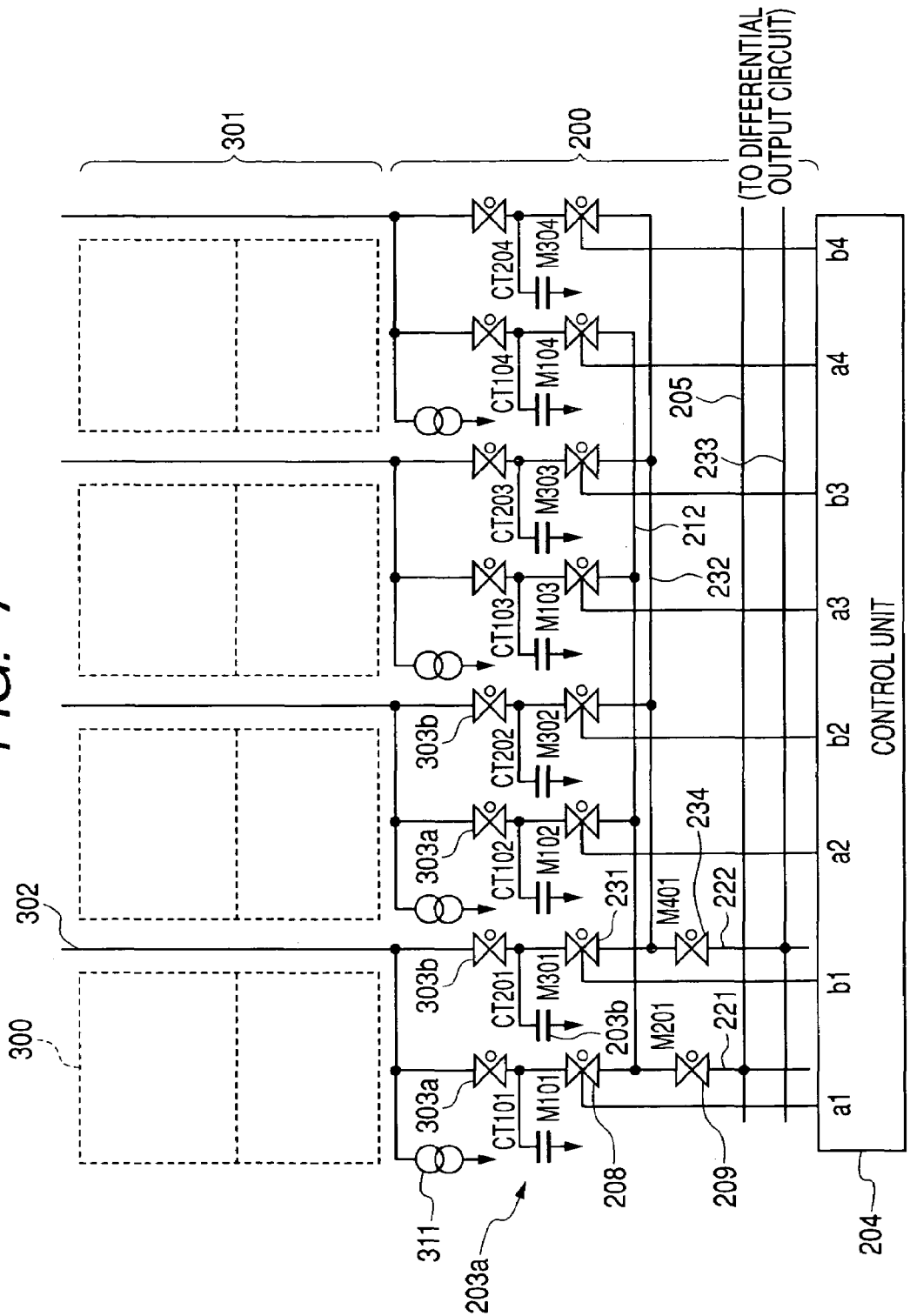
FIG. 7 is an equivalent circuit view of FIG. 4.

FIG. 4 is a layout schematic view showing two blocks, FIG. 5 is a view showing one block in detail, FIG. 6 is a view showing a connection state of the difference output circuit, and FIG. 7 is an equivalent circuit view.

The readout circuit shown in FIGS. 4 to 7 has, in a solid state image pickup device having a light receiving unit 301 comprised of pixels 300 arranged in a two-dimensional shape, a signal readout unit 200 to be connected via vertical output lines 302 (See FIG. 7) provided in common for each column of the light receiving unit 301; a control unit 204; and a differential output circuit (processing unit) 240 (See FIG. 5). The signal readout unit 200 is constructed by first and second signal readout units to be provided in a pair for each column of the light receiving unit 301. In this respect, reference numeral 311 in FIG. 7 denotes constant-current power to be connected to the vertical output lines 302 of the light receiving unit 301 for each column thereof.

The first signal readout unit is, of two selection switches to be connected in parallel to the vertical output lines 302 of the light receiving unit 301 for each column thereof, connected to one selection switch 303a (See FIG. 7), and has: a first line memory 203a to be constructed by a plurality of holding capacities (memory units) CT101 to CT108 for holding signals to be read out thereby; first switches M101 to M108 (208) connected to each of their holding capacities CT101 to CT108; a first common signal line 212 comprising a predetermined number (4 pieces in the example shown in the Figure) of the first switches M101 to M108 (208) connected together for each block; and second switches M201, M202 (209) for connecting the first common signal line 212 to a second common signal line 205. Due to this structure, the first signal readout unit reads out signals to be held by each holding capacity CT101 to CT108 of the first line memory 203a on the second common signal. line 205 via the first switches M101 to M108 (208), the first common signal line 212, and the second switches M201, M202 (209).

The second signal readout unit is, of two selection switches to be connected in parallel to the vertical output lines 302 of the light receiving unit 301 for each column thereof, connected to the other selection switch 303b (See FIG. 7), and has: a second line memory 203b to be constructed by a plurality of holding capacities (memory units) CT201 to CT208 for holding signals to be read out thereby; third switches M301 to M308 (231) connected to each of the holding capacities CT201 to CT208; a third common signal line 232 comprising a predetermined number (4 pieces in the example shown in the Figure) of the third switches 231 connected together for each block; and fourth switches M401, M402 (234) for connecting the third common signal line 232 to a fourth common signal line 233. Due to this structure, the second signal readout unit reads out signals to be held by each holding capacity CT201 to CT208 of the second line memory 203b on the fourth common signal line 233 via the third switches M301 to M308 (231), the third common signal line 232, and the fourth switches M401, M402 (234).

Each holding capacity constituting the first and second line memories 203a, 203b is arranged to be alternately adjacent for each column. In other words, of two blocks, in the first block B1, from the left column over to the right column, the holding capacities CT101, CT301, CT102, CT302, CT103, CT303, CT104, and CT304 are arranged in order, and in the second block, from the left column over to the right column, the holding capacities CT105, CT305, CT106, CT306, CT107, CT303, CT307, CT108 and CT308 are arranged in order.

Between the electrodes of the second switches M201, M202 (209) and the second common signal line 205, there is provided first outgoing wiring 221. Also, between the electrodes of the fourth switches M401, M402 (234) and the fourth common signal line 233, there is provided second outgoing wiring 222.

The differential output circuit 240 extracts a difference signal between the output from the first signal readout unit and the output from the second signal readout unit.

In the control unit 204, in the example shown in the Figure, the first control unit CTL1 is allocated to the first block B1, and the second control unit CTL2 is allocated to the second block B2 in respect of the function respectively. The first control unit CTL1 controls opening/closing of the first switches M101 to M104 (208), the third switches M301 to M304 (231), the second switch M201 (209) and the fourth switch M401 (234) which are to be allocated to the first block B1. Also, the second control unit CTL2 controls opening/closing of the first switches M105 to M108 (208), the third switches M305 to M308 (231), the second switch M202 (209) and the fourth switch M402 (234) which are to be allocated to the second block B2. In this respect, control wiring to be connected to the second switches M201, M202 (209) and the fourth switches M401, M402 (234) from the control unit 204 is not shown.

In FIGS. 4 to 7, reference symbols a1 to a8 denote a control line (hereinafter, "first control line") for opening and closing the first switches M101 to M108 (208) for reading out from the first to eighth holding capacities CT101 to CT108 from the left of the first line memory 203a; and b1 to b8 denote a control line (hereinafter, "second control line") for opening and closing the third switches M301 to M308 (231) for reading out from the first to eighth holding capacities CT201 to CT208 from the left of the second line memory 203b. In the present example, the first and second control lines a1, b1 change from L level to H level at the same time, and read out signals from each holding capacity on the second and fourth common signal lines 205, 233 respectively.

The description will be made of an example of arrangement of the first and second control lines a1 to a8, b1 to b8, and the first and second outgoing lines 221, 222.

Figure 16:
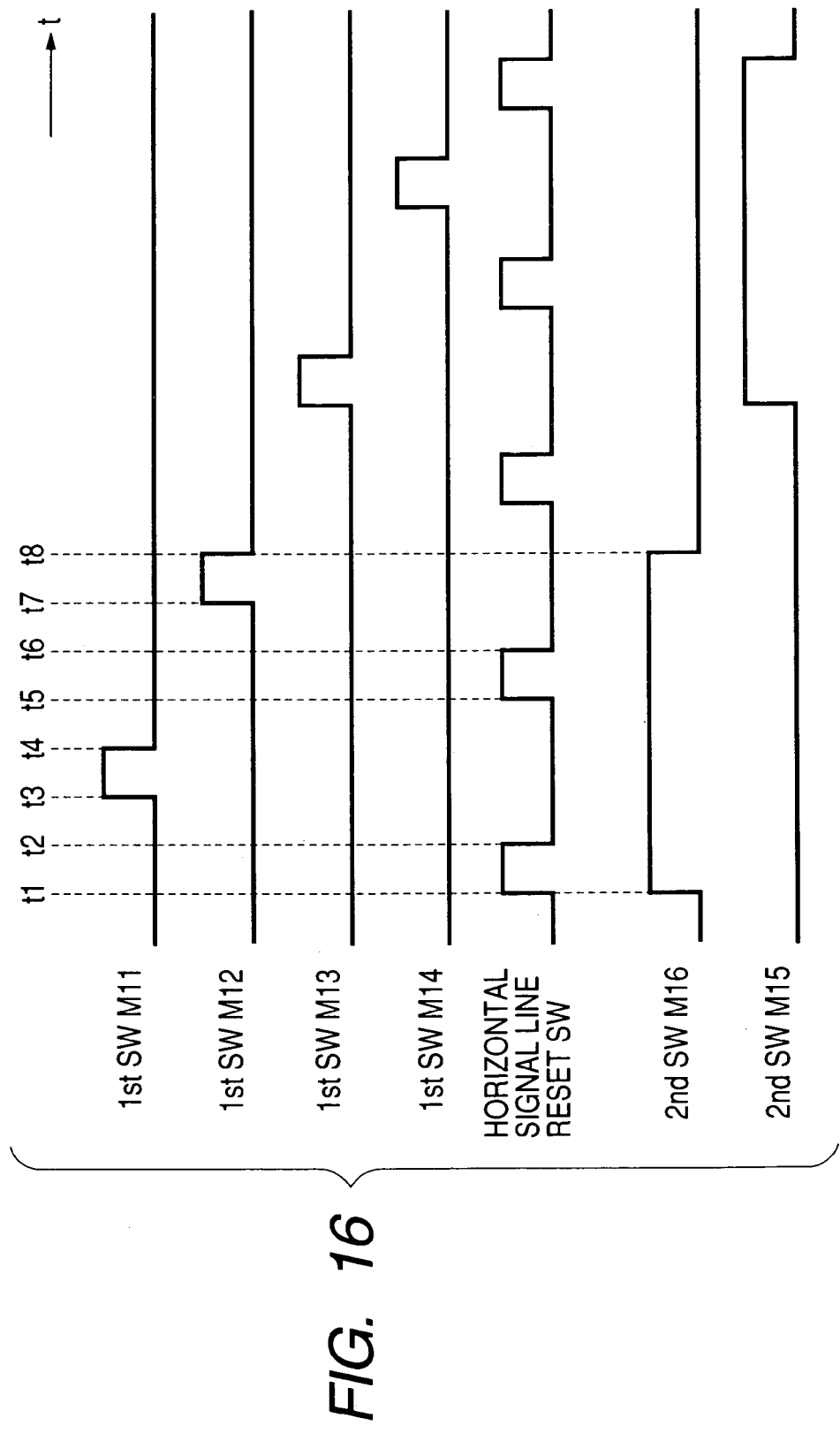
FIG. 16 is a timing chart explaining readout timing in a solid state image pickup device of the prior art.

First, since the first and second control lines a1, b1 to be arranged at the first place from the left within the first block B1 are in proximity to the first and second outgoing wiring 221, 222, as described also in the conventional technique, in addition to the capacity of an overlapping portion shown in FIG. 16, potential changes of the first and second control lines a1 to a8, b1 to b8 affect the voltage at the second and fourth common signal lines 205, 233 via parasitic capacity Csa1, Csb1, Cna1 and Cnb1 (Csa1 is parasitic capacity occurring between the first control line a1 and the first outgoing wiring 221, Csb1 is parasitic capacity occurring between the second control line b1 and the first outgoing wiring 221, Cna1 is parasitic capacity occurring between the first control line a1 and the second outgoing wiring 222, Cnb1 is parasitic capacity occurring between the second control line b1 and the second outgoing wiring 222) as shown in FIG. 5.

In contrast to this, since the first and second control lines a2, b2 to be arranged at the second place from the left within the first block B1 are spaced apart from the first and second outgoing wiring 221, 222, the potential change that affects the voltage at the second and fourth common signal lines 205, 233 becomes only the component through the capacity (not shown in FIGS. 4 to 7) of the overlapping portion shown in FIG. 16.

In other words, in the second and fourth common signal lines 205, 233, the following voltage change occurs.

A voltage change $\Delta V_{CH\_2}$ occurring in the second common signal line 205 is represented as the following expression.

$$\Delta V_{CH\_2} \approx VDD \times (Csa1+Cc \times 2)/(Csb1+Cc \times 2)/CH \quad CH+VDD \times$$

A voltage change $\Delta V_{CH\_4}$ occurring in the fourth common signal line 233 is represented as the following expression.

$$\Delta V_{CH\_4} \approx VDD \times (Cna1+Cc \times 2)/(Cnb1+Cc \times 2)/CH \quad CH+VDD \times$$

In the present example, there are provided first outgoing wiring 221 provided between the electrodes of the second switches M201, M202 (209) and the second common signal line 205, and second outgoing wiring 222 provided between the electrodes of the fourth switches M401, M402 (234) and the fourth common signal line 233, and the first and second control lines a1 to a8, b1 to b8, which are connected from the control unit 204 at least to the first and third switches M101 to M108 (208), M301 to M308 (231), are arranged at a position line-symmetric with respect to a center line (See broken line c1 of FIG. 4) between the first outgoing wiring 221 and the second outgoing wiring 222.

In other words, each of the above-described wirings a1 to a8, b1 to b8, 221, 222 is arranged as indicated by a broken line c1 of FIG. 5 in such a manner that a center line between the first outgoing wiring 221 and the second outgoing wiring 222, and a center line between the first control line a1 and the second control line b1 coincide with each other. As a result, a distance between the first control line a1 and the first outgoing wiring 221, and a distance between the second control line b1 and the second outgoing wiring 222 are equal, and a distance between the second control line b1 and the first outgoing wiring 221 and a distance between the first control line a1 and the second outgoing wiring 222 become equal, and concerning parasitic capacity Cna1, Cnb1, Csb1 and Csa1, relation of Csb1=Cna1 and Csa1= Cnb1 is satisfied.

Therefore, according to the present example, since a difference between "output from the second common signal line 205" and "output from the fourth common signal line 233" is taken, output $V_{OUT}$ from the differential output circuit 240 becomes as below, both can cancel each other out, and any periodic pattern noise in each block (in the example shown in the Figure, 4 bits concerning readout period of four pieces of holding capacity) to be seen in a readout circuit converted into blocks of the conventional example did not occur.

$$V_{OUT} = \Delta V_{CH\_2} - \Delta V_{CH\_4} = 0 \text{ mV}$$

Also, conventionally there has been the problem that the second common signal line itself, in which long run length has normally been forced, becomes an antenna to pick up disturbance noise or power source noise for fluctuating the output. According to the present example, however, there is arranged the fourth common signal line in a pair with the second common signal line and difference processing of the output is performed via the differential output circuit, and therefore, the above-described disturbance noise and the power source noise are also subtracted, such a problem that the output fluctuates as described above can be advantageously solved.

FOURTH EXAMPLE

Figure 8:
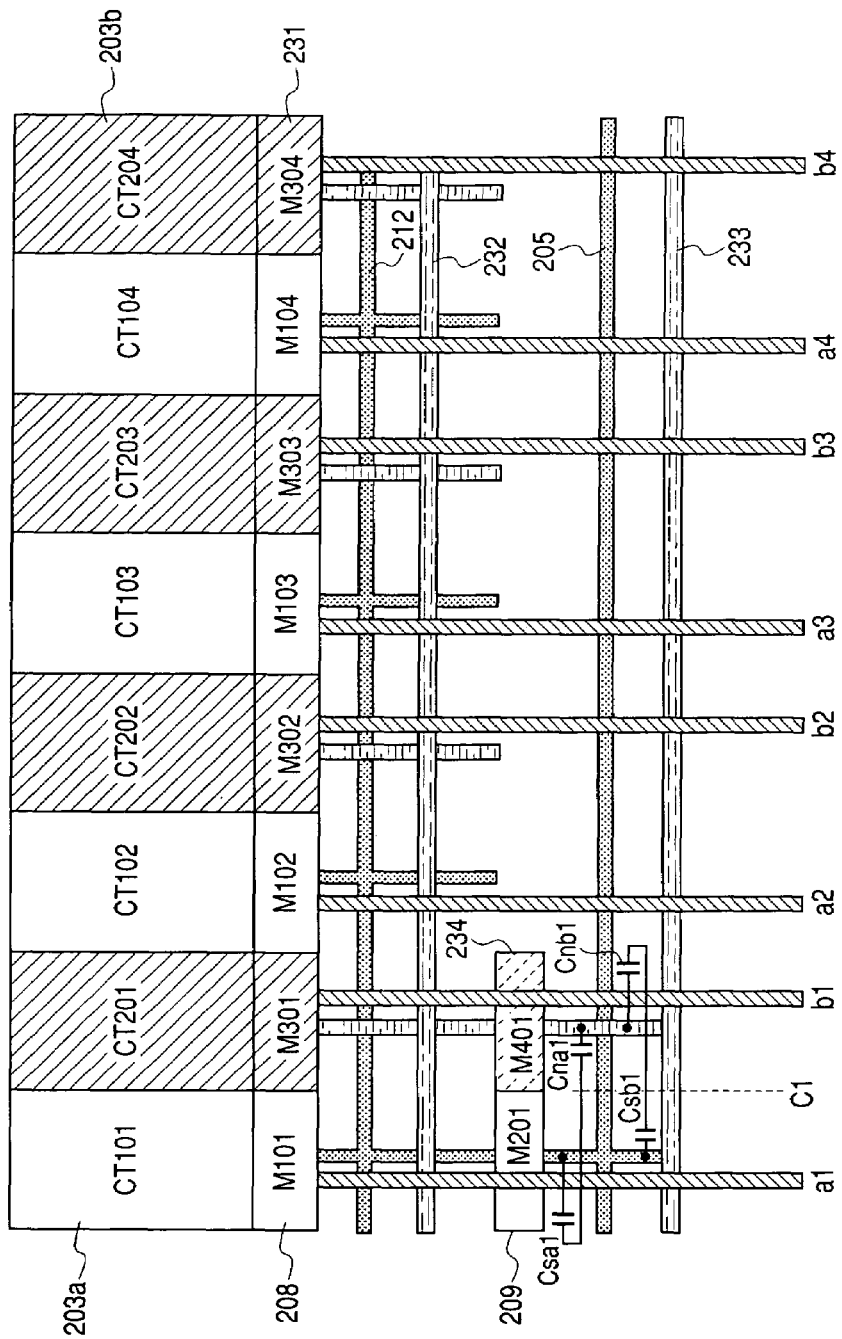
FIG. 8 is a layout schematic view showing the readout circuit according to the fourth example of the present invention.

With reference to FIG. 8, the description will be made of the present example. FIG. 8 is a layout schematic view showing the interior of the block according to the present example. Component elements identical to those in the above-described third example are designated by the identical reference numbers, and the description thereof will be omitted.

The present example has also structure similar to that of the third example describe above, but is different in arrangement of the first and second outgoing lines 221, 222, and the first and second control lines a1, b1. In other words, although the first and second control lines a1, b1 have been arranged inside between the first and second control lines a1, b1 in the third example, they have been arranged in the outside in the present example. In this case, however, as in the case of the third example, the center line between the first outgoing wiring 221 and the second outgoing wiring 222 and the center line between the first control line a1 and the second control line b1 are caused to coincide with each other at a portion indicated by the broken line c1 in FIG. 5.

Therefore, even in the present example, as in the case of the third example, a distance between the first control line a1 and the first outgoing wiring 221, and a distance between the second control line b1 and the second outgoing wiring 222 are equal, and a distance between the second control line b1 and the first outgoing wiring 221 and a distance between the first control line a1 and the second outgoing wiring 222 become equal, and concerning parasitic capacity Cna1, Cnb1, Csb1 and Csa1, relation of Csb1=Cna1 and Csa1=Cnb1 is satisfied. Therefore, as a result, no periodic pattern noise occurred in the output $V_{OUT}$ in the differential output circuit (not shown).

Also, in the present example and the third example, even if metal layers of the first and second outgoing wiring 221, 222 and metal wiring of the first and second control lines a1, b1 are arranged in different layers, no subtraction error due to adjustment displacement and the like occurs.

FIFTH EXAMPLE

Figure 9:
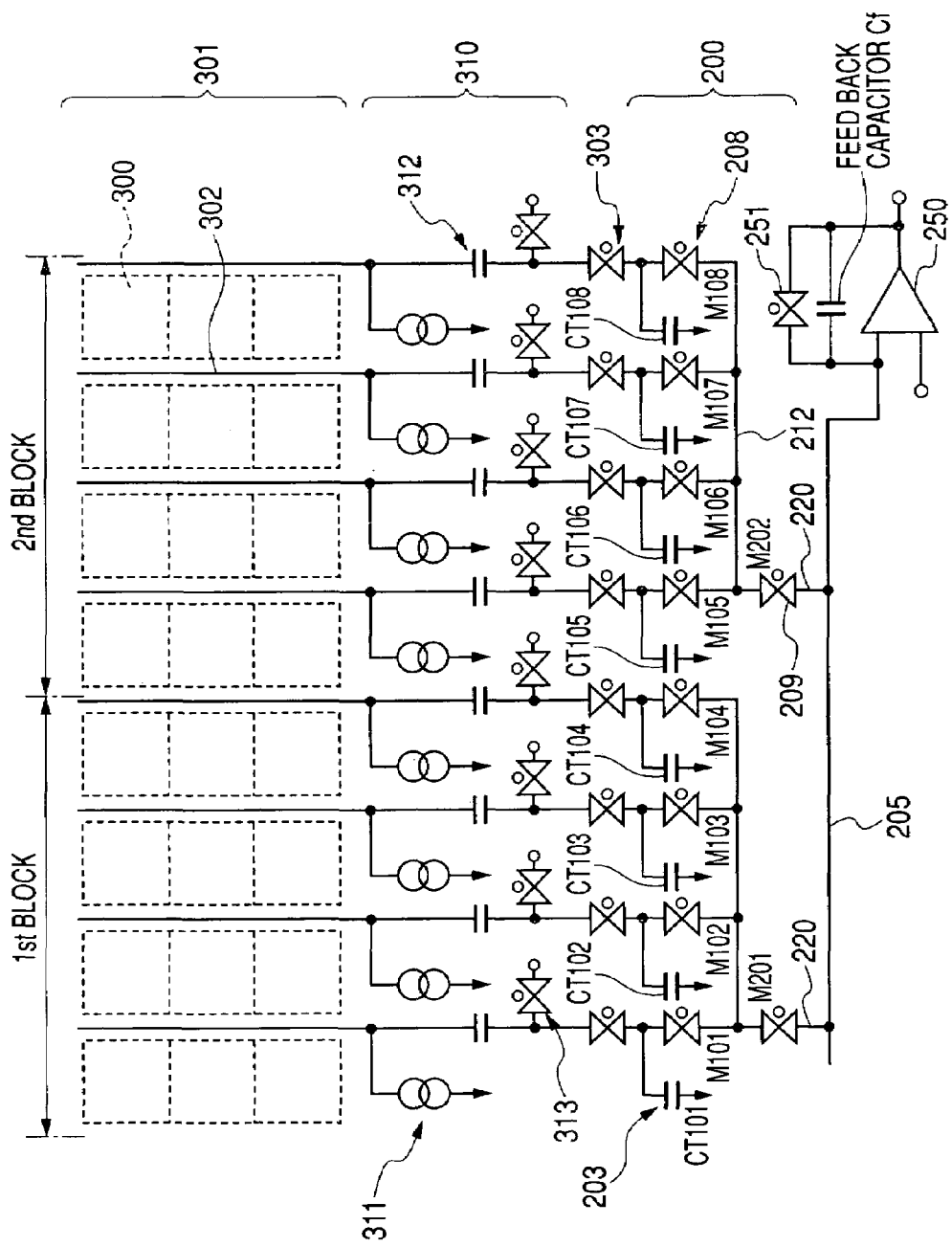
FIG. 9 is an equivalent circuit view showing a two-dimensional solid state image pickup device using a readout circuit according to the fifth example of the present invention.

The present example is an example in which the layout shown in the first example (See FIGS. 1, 2) has been applied to a two-dimensional solid state image pickup device to be shown by such an equivalent circuit view as shown in FIG. 9. Hereinafter, component elements identical to those in the first example are designated by the identical reference numbers, and the description thereof will be simplified or omitted.

The two-dimensional solid state image pickup device shown in FIG. 9 has: a light receiving unit 301 composed of pixels (including light receiving elements such as photodiode, and amplifier circuit) 300; a signal readout unit 200 having line memories CT101 to CT108 (203), first switches M101 to M108 (208), first common signal line 212, second switches M201, M202 (220), and second common signal line 205 on the output side of the selection switch 303 to be connected to a vertical output line 302 provided in common for each column of the light receiving unit 301; and an output amplifier 250 to be connected to the second common signal line 205. The signal readout unit 200 has been converted into blocks every four pieces of holding capacity (4 columns) of the line memory 203 (See the first block B1 and second block B2 in the Figure).

In the present example, in order to eliminate fixed pattern noise and random noise of amplifier circuits (not shown) to be arranged for each of the pixels 300 of the light receiving unit 301, on the vertical output line 302 between the light receiving unit 300 and the signal readout unit 200, there is provided a clamping circuit (constant-current power 311, clamping capacity 312, clamping switch (switch) 313) 310 to each column. As a result, on the line memory 203 in the Figure, there will be held only the optical signal component from which the noise signal has been eliminated.

The output amplifier 250 has been constructed such that its output is caused to feed back on the input side of the second common signal line 205 to be connected to the line memory 203 via a feed back capacitor Cf, and its amplifier gain is determined by the ratio between the capacity (CT) of the line memory 203 and the feed back capacitor (Cf) of the output amplifier 250 (reference numeral 251 in the Figure denotes switches to be connected to the feed back capacitor Cf in parallel). In other words, the gain of the output amplifier 250 is given by CT/Cf.

This output amplifier 250 is of a model in which gain error in units of block due to variations in capacity every block to be expected when converted into blocks is restricted, and is particularly suitable for the present invention when converted into blocks. Even if, for example, the capacity of the "first common signal line" 212 within each block varies in units of block, no gain error occurs in the gain of the output amplifier 250 because it does not contain the capacity (CH) of the common signal line.

The voltage change $\Delta V_{OUT}$ (difference in level of output) in such an amplifier model is given as described below.

$$\Delta V_{OUT} \approx VDD \times Ca1/Cf$$

Therefore, even in the present example, as in the case of the above-described example, excellent sensor output free from periodic pattern noise can be obtained.

Although in the present example, the description has been made of a case where it has been applied to a two-dimensional solid state image pickup device, the similar effect could be obtained even when it has been applied to the line sensor.

In this respect, each switch 208, 209, 303, 313 for use with the equivalent circuit view of FIG. 9 may be used even in a type in which NMOS and PMOS are connected in parallel, or in a type of only NMOS or only PMOS. The same is applicable to switches for use with other examples.

SIXTH EXAMPLE

Figure 10:
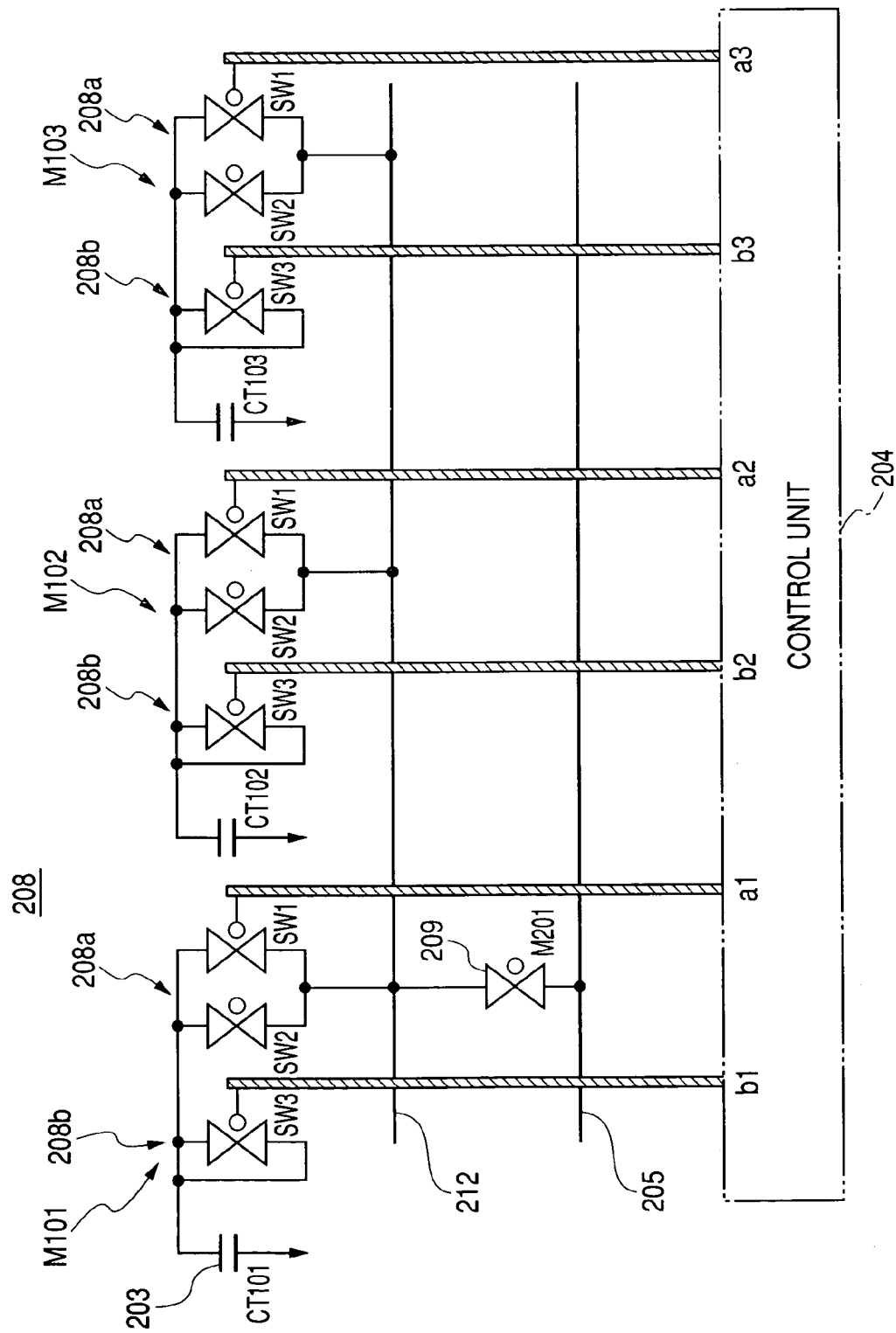
FIG. 10 is an equivalent circuit view and a layout schematic view showing a two-dimensional solid state image pickup device using a readout circuit according to the sixth example of the present invention.

The present example is, of the two-dimensional solid state image pickup device in the above-described fifth example (See FIG. 7), obtained by replacing the readout circuit from the line memory 203 onward with the equivalent circuit shown in FIG. 10. Hereinafter, component elements identical to those in the fifth example are designated by the identical reference numbers, and the description thereof will be simplified or omitted.

In FIG. 10, reference symbols a1 to a3 denote control wiring (positive signal supply wiring) for opening and closing the first switches M101 to M103 (208) on the basis of a control signal (positive signal) from the control unit 204; and b1 to b3, control wiring (anti-signal supply wiring) for supplying, from the control unit 204, its inversion signal.

The first switch 208 is composed of a switch 208a through which the control electrode (gate electrode) is connected to the positive signal supply wiring a1 to a3, and a dummy switch 208b through which the control electrode is connected to the anti-signal supply wiring b1 to b3. A switch 208a is composed of two switches SW1, SW2 to be connected to the second switch 209 in parallel. The dummy switch 208b is one switch SW3, that is, becomes ½ size of the switch.

The present example has been designed so as to restrict switch deflection by supplying the control signal (positive signal) from the control unit 204 to a switch 208a of the first switch 208 via the positive signal supply wiring a1 to a3, and at the same time, supplying the inversion signal to a dummy switch 208b which has been designed to ½ size of the switch 208a in the first switch 208 via the anti-signal supply wiring b1 to b3.

In other words, in the fifth example, when the first switch (M101) changes from an ON-state to an OFF-state, distribution between the gate electrode of the switch and an electric charge induced under channel of the switch MOS causes the voltage at a node 212 and the second common signal line 205 to fluctuate. As a result, output fluctuation occurs. In contrast to this, the dummy switch provided in the present example can cancel out this distributed charge by MOS capacity of the dummy switch and the inversion signal.

Therefore, according to the present example, excellent sensor output free from any periodic pattern noise and with deflection of output due to opening/closing of the switch restricted could be obtained.

In addition, when there has been confirmed a case where the dummy switch 208b of the first switch 208 is not arranged, if the positive signal supply wiring a1 and the anti-signal supply wiring b1 are arranged so as to be line-symmetric with respect to the outgoing wiring, excellent sensor output free from the periodic pattern noise could be obtained although output deflection occurs.

SEVENTH EXAMPLE

Figure 11:
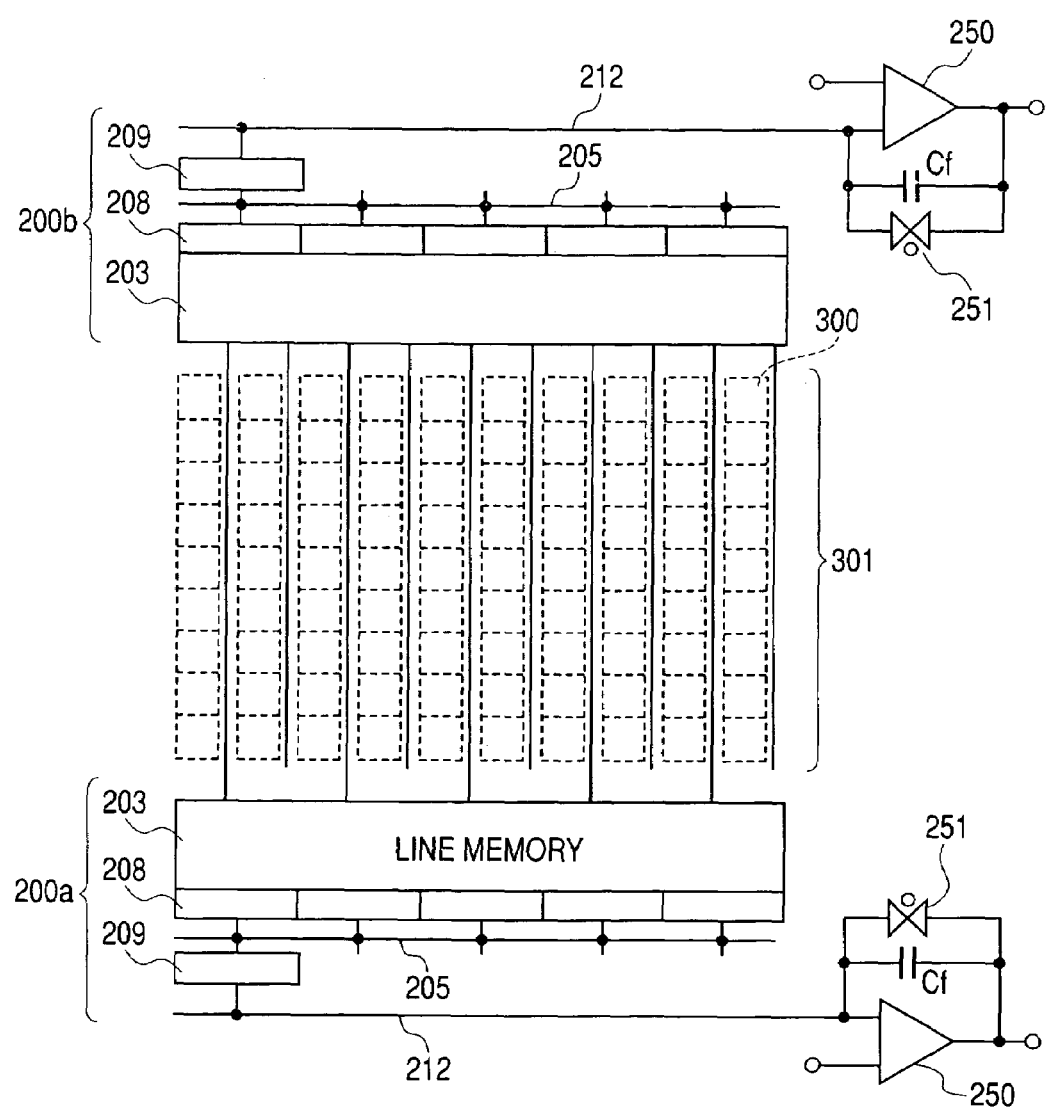
FIG. 11 is an equivalent circuit view showing a solid state image pickup device according to the seventh example of the present invention.

With reference to FIG. 11, the description will be made of the present example. Component elements identical to those in the foregoing example are designated by the identical reference numbers, and the description thereof will be omitted.

The two-dimensional solid state image pickup device shown in FIG. 11 has, as in the foregoing, a signal readout unit (readout circuit) for reading out output from the light receiving unit 301 composed of pixels 300 of predetermined pieces (in the Figure, 90 pieces of 9 lines×10 columns) arranged in the two-dimensional shape. This signal readout unit is constructed by arranging an odd number column signal readout unit 200a for reading out output from pixels of the odd number columns (in the example in the Figure, first column, third column, fifth column, seventh column, ninth column) and an even number column signal readout unit 200b for reading out output from pixels of the even number columns (in the example in the Figure, second column, fourth column, sixth column, eighth column, tenth column) in a position (vertical position in the Figure) for sandwiching the light receiving unit 301 therebetween.

As a result, each pitch of the line memory could be secured to double the pixel pitch.

In other words, distances La, Lb (See FIG. 2) between the outgoing wiring 220 shown in FIGS. 1, 2 and the control lines a2, b2 (positive signal supply wiring, anti-signal supply wiring) could be secured to double as compared with when the signal readout unit is only on one side. That is, an effect of the control lines a2, b2 on the outgoing wiring 220 could be more effectively restricted. Particularly, when the pixel pitch is as small as about 3 μm, the effect of the control lines a2, b2 is somewhat seen, but according to the present example, the effect has been reduced to half, and reduced to a level which can be hardly viewed.

EIGHTH EXAMPLE

Figure 12:
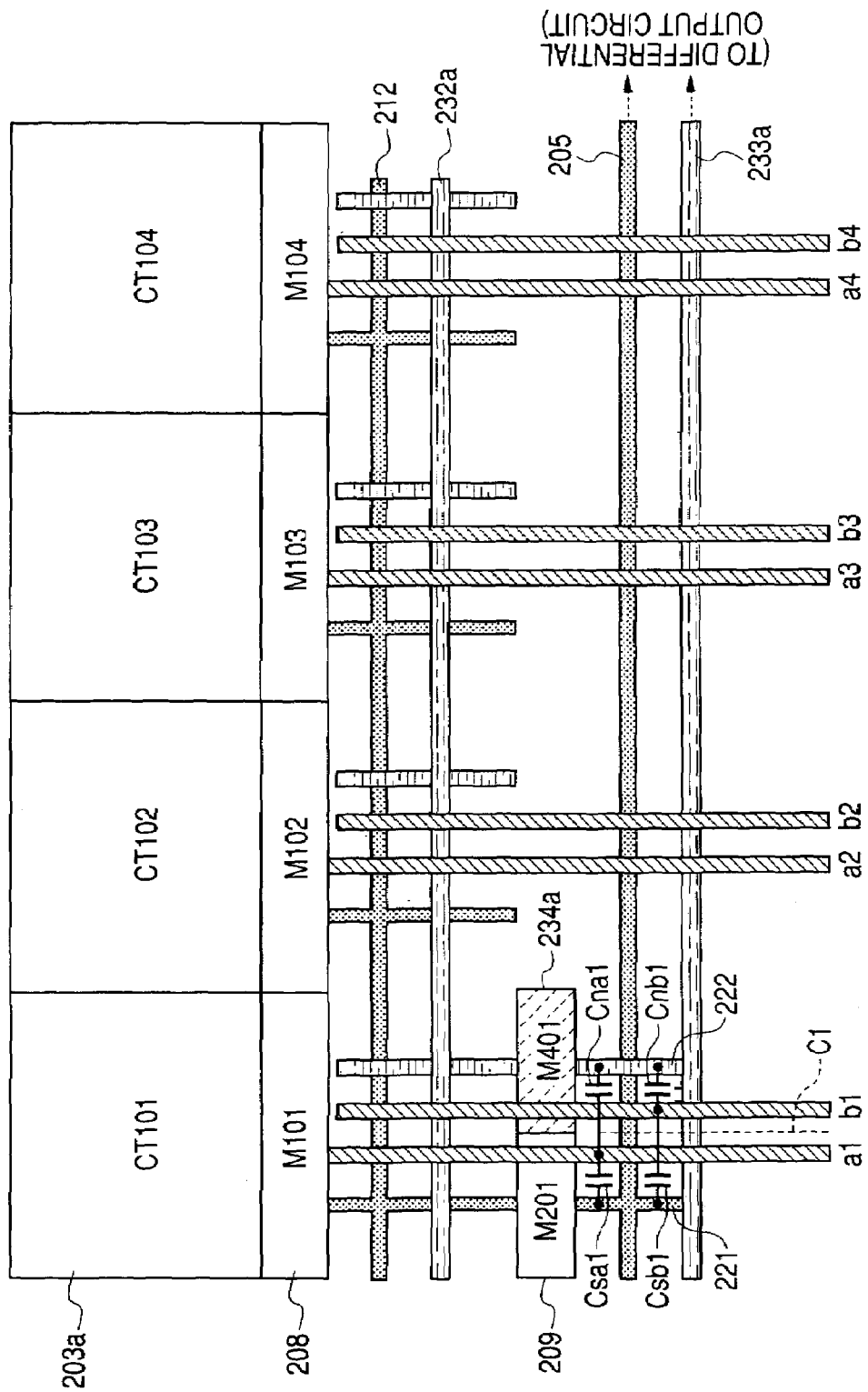
FIG. 12 is a layout schematic view showing the readout circuit according to the eighth example of the present invention.

With reference to FIG. 12, the description will be made of the present example. Component elements identical to those in the foregoing example are designated by the identical reference numbers, and the description thereof will be omitted.

In the present example, of the structure similar to the third example (See FIGS. 4 to 7), in order to secure the capacity of the first line memory 203a, a place which the second line memory (See FIGS. 4 to 7) has occupied has been allocated to a place for the first line memory 203a. In other words, in the present example, the second line memory which has been explained in the second example, has not been arranged. In the present example, however, since the differential output circuit (not shown in FIG. 12) shown in FIG. 6 is used, it is not connected to the electrode of the first switch 208 actually, but therefore, the dummy third common signal line 232a, fourth common signal line 233a and fourth switch 234a to which a signal from the line memory 203a is not inputted, have been also arranged as in the case of the second example.

As a result, according to the present example, the switch deflection could be also eliminated by the differential output circuit.

In this respect, although not shown in FIG. 12, in order to improve the precision of this difference processing, the capacity corresponding to one cell of the first line memory 203a per the differential output circuit has been connected to the dummy fourth common signal line 233a.

Also, as another feature of the present example, the dummy third common signal line 232a, fourth common signal line 233a and fourth switch 234a are arranged, whereby when the common signal line such as particularly a solid state image pickup device of film size is applied to an exceedingly long device, jumping noise from the common signal line which occurs could be restricted. In other words, the effect as shown in the third example could be obtained.

Also, conventionally, when the common signal line is long, there has been the problem that the wiring becomes an antenna to pick up disturbance noise or power source noise for fluctuating the output. Concerning this problem, in the present example, since there is arranged the dummy fourth common signal line 233 in a pair with the second common signal line 205 and difference processing is performed, the above-described disturbance noise and the power source noise are also subtracted. Therefore, there can be obtained an effect that the problem of the output fluctuation does not arise.

NINTH EXAMPLE

Figure 13:
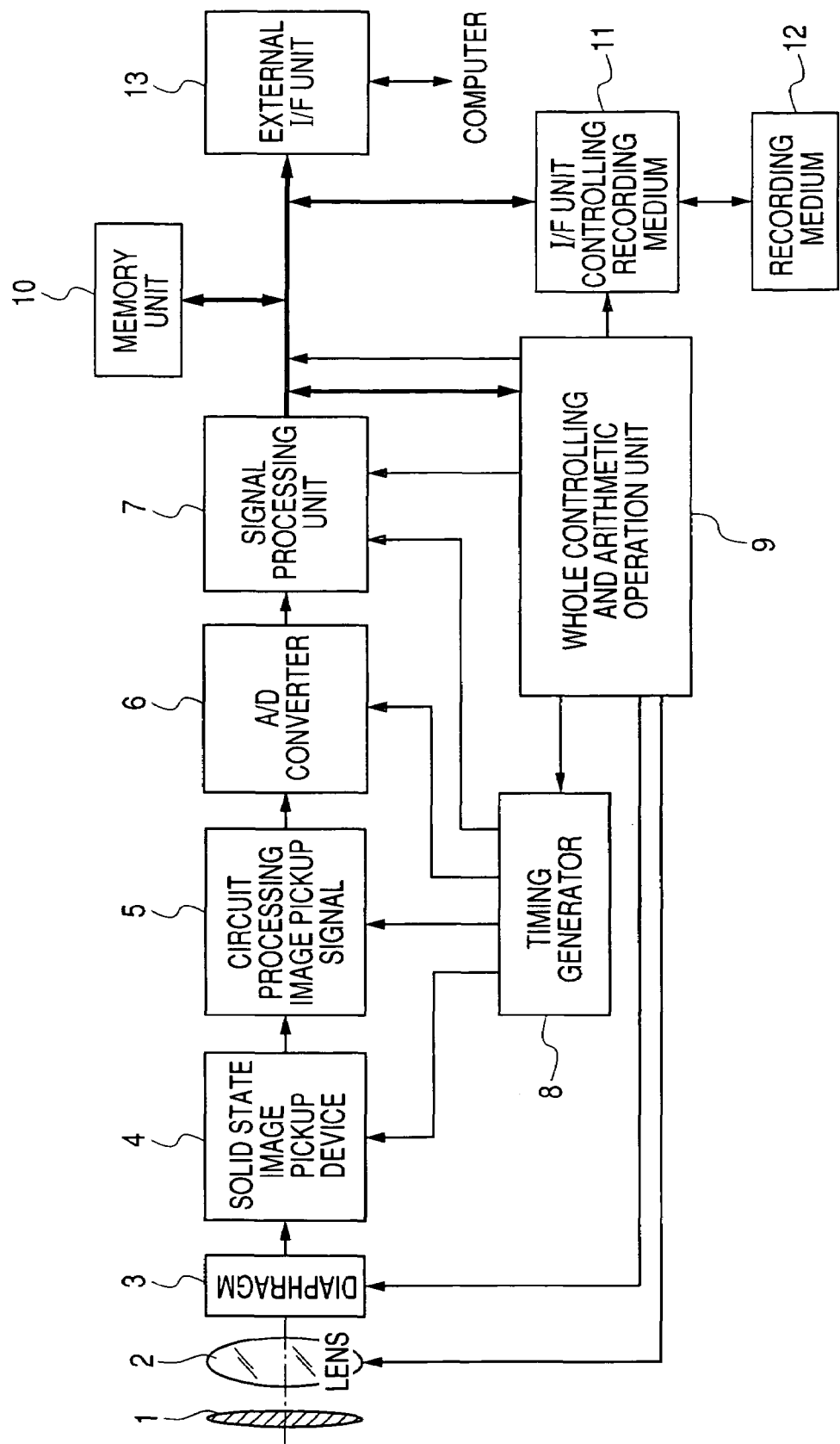
FIG. 13 is a block diagram showing an example when a solid state image pickup device using a readout circuit according to the present invention has been applied to a still camera.
Figure 14:
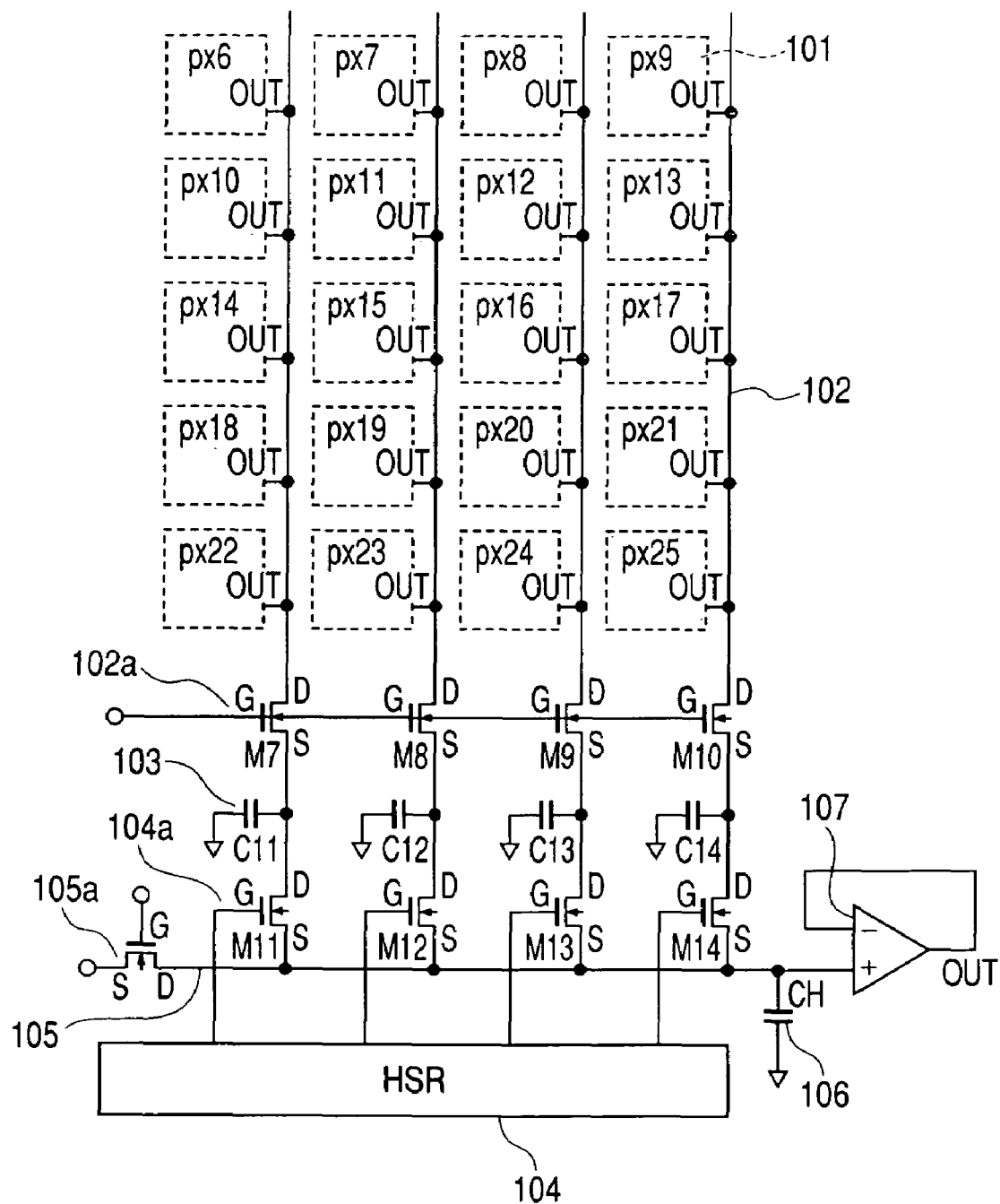
FIG. 14 is an equivalent circuit diagram showing the solid state image pickup device of a conventional example.
Figure 15:
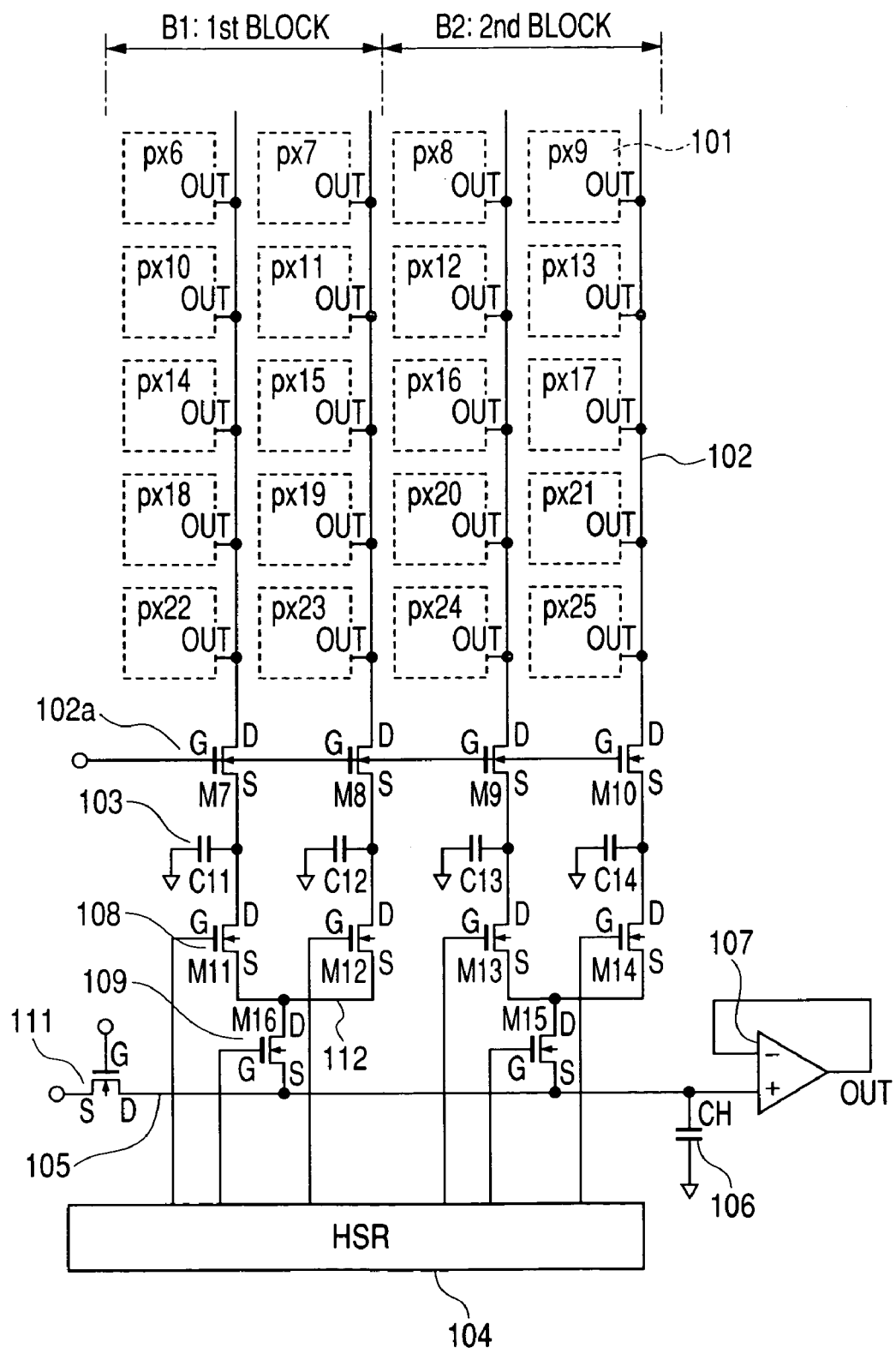
FIG. 15 is an equivalent circuit view showing a solid state image pickup device using a readout circuit converted into blocks of the prior art.

With reference to FIG. 13, the detailed description will be made of an example when a solid state image pickup device using a readout circuit according to the present invention has been applied to a still camera. FIG. 13 is a block diagram when the solid state image pickup device according to the present invention has been applied to a "still video camera".

In FIG. 13, reference numeral 1 denotes a barrier for protecting the lens and serving dually as a main switch; 2, a lens for focusing an optical image of an object on a solid state image pickup device 4; 3, a diaphragm for varying a quantity of light that has passed through the lens 2; 4, the solid state image pickup device for taking in the object focused by the lens 2 as an image signal; 6, an A/D converter for A/D converting an image signal to be outputted from the solid state image pickup device 4; 7, a signal processing unit for performing various corrections on image data outputted from the A/D converter 6 and compressing data; 8, a timing generator for outputting various timing signals to the solid state image pickup device 4, a circuit processing image pickup signal 5, the A/D converter 6, and the signal processing unit 7; 9, a whole controlling and arithmetic operation unit for controlling various arithmetic operation and the entire still video camera; 10, a memory unit for temporarily storing image data; 11, an I/F unit for recording or reading out on a recording medium; 12, a recording medium with a semiconductor memory and the like detachably mountable for recording or reading out image data; and 13, an I/F unit for communicating with an external computer and the like.

Next, the description will be made of an operation of the still video camera having the above-described structure during photography.

When the barrier 1 is opened, the main power supply is turned ON, next the power supply of the control system is turned ON, and further the power supply of the image pickup system circuit such as the A/D converter 6 is turned ON. Then, in order to control a quantity of exposure, the whole controlling and arithmetic operation unit 9 holds the diaphragm 3 wide open, a signal outputted from the solid state image pickup device 4 is converted by the A/D converter 6, and thereafter is inputted into the signal processing unit 7. On the basis of the data, an arithmetic operation of the exposure is performed by the whole controlling and arithmetic operation unit 9. From this photometry result, brightness is judged, and the whole controlling and arithmetic operation unit 9 controls the diaphragm in response to the result.

Next, on the basis of a signal outputted from the solid state image pickup device 4, a high-frequency component is taken out, and a distance to the object will be calculated by the whole controlling and arithmetic operation unit 9. Thereafter, the lens is driven to judge whether or not focusing has been accurately made, and when it is judged that focusing has not been made, the lens is driven again to measure the distance. Thus, after it is confirmed that the focusing has been accurately made, full-scale exposure is started. After the completion of the exposure, an image signal outputted from the solid state image pickup device 4 is A/D converted by the A/D converter 6, and passes through the signal processing unit 7 to be written on the memory unit by the whole controlling and arithmetic operation unit 9. Thereafter, data accumulated in the memory unit 10 passes through the I/F unit controlling recording medium under the control of the whole controlling and arithmetic operation unit 9 and is recorded on the detachably mountable recording medium 12 such as the semiconductor memory. Also, the data may pass through the external I/F unit 13 and be directly inputted into the computer or the like for processing the image.

As described above, the present invention can be applied to use application of the solid state image pickup device and its readout circuit to be used in the line sensor or area sensor.

This application claims priority from Japanese Patent Application No. 2003-312899 filed Sep. 4, 2003, which is hereby incorporated by reference herein.

What is claimed is:

1. A readout circuit comprising:
a line memory constituted by a plurality of memory units for holding signals;
first switches, each connected to each memory unit of said line memory;
a first common signal line comprising a predetermined number of said first switches connected together, and
a second switch for connecting said first common signal line to a second common signal line; a signal readout unit for selectively reading out signals to be held in each memory unit of said line memory on said second common signal line via said first switch, said first common signal line, and said second switch; and
a control unit for controlling opening/closing of said first and second switches,
wherein said readout circuit has outgoing wiring to be provided between an electrode of said second switch and said second common signal line, and control wiring for being connected from said control unit to at least either said first switch or said second switch,
wherein said control wiring has first signal supply wiring and anti-signal second signal supply wiring to which a pair of a first signal and a second signal an anti-signal, in which a logical level has been reversed with respect to each other, are respectively supplied, and
wherein said positive first signal supply wiring and said anti-signal second signal supply wiring are arranged so as to be line-symmetric with respect to said outgoing wiring.

2. The readout circuit according to claim 1, wherein said positive first signal supply wiring and said anti-signal second signal supply wiring are connected to said first switch.

3. The readout circuit according to claim 1, wherein said positive first signal supply wiring, said second signal supply wiring, and said outgoing wiring are formed with the same wiring layer.

4. A readout circuit comprising:
a first line memory constituted by a plurality of memory units for holding signals; first switches each connected to each memory unit of said first line memory; a first common signal line comprising a predetermined number of said first switches connected together; a second switch for connecting said first common signal line to a second signal line; a first signal readout unit for selectively reading out signals to be held in each memory unit of said first line memory on said second common signal line via said first switch, said first common signal line, and said second switch;
a second line memory to be constituted by a plurality of memory units for holding signals; a third switch connected to each memory unit of said second line memory; a third common signal line comprising a predetermined number of said third switches connected together; a fourth switch for connecting said third common signal line to a fourth common signal line; a second signal readout unit for selectively reading out signals to be held by each memory unit of said second line memory on said fourth common signal line via said third switch, said third common signal line and said fourth switch;
a processing unit for extracting a difference signal between output from said first signal readout unit and output from said second signal readout unit; and
a control unit for controlling opening/closing of said first and third switches,
wherein said readout circuit has:
first outgoing wiring to be provided between the electrode of said second switch and said second common signal line; second outgoing wiring to be provided between the electrode of said fourth switch and said fourth common signal line; and control wiring connected from said control unit to said first and third switches, and
wherein said control wiring is arranged at a position to become line-symmetric with respect to a center line between said first outgoing wiring and said second outgoing wiring.

5. The readout circuit according to claim 4, wherein said control wiring and said outgoing wiring are formed with the same wiring layer.

6. A solid state image pickup device, comprising:
a light receiving unit comprised of a plurality of pixels;
a line memory to be constituted by a plurality of memory units for holding once signals from each of said pixels; and a readout circuit for selectively reading out signals held by each memory unit of said line memory,
wherein said readout circuit has:
a plurality of first switches each connected to one of said memory units of said line memory; a first common signal line comprising a predetermined number of said first switches connected together; a second switch for connecting said first common signal line to a second common signal line; a signal readout unit for selectively reading out signals to be held by each of said memory units of said first line memory on said second common signal line via said first switch, said first common signal line, and said second switch; a control unit for controlling opening/closing of said first and second switches; outgoing wiring provided between the electrode of said second switch and said second common signal line; and control wiring to be connected to at least either said first or second switch from said control unit, wherein said control wiring has positive first signal supply wiring and anti-signal second signal supply wiring to which a pair of a first signal and a second signal anti-signal in which the logical level has been reversed with respect to each other is supplied respectively, and wherein said first positive signal supply wiring and said second signal anti-signal supply wiring are arranged so as to be line-symmetric with respect to said outgoing wiring.

7. The solid state image pickup device according to claim 6, wherein said first signal supply wiring and said second signal supply wiring are connected to said first switch.

8. The solid state image pickup device according to claim 7, wherein either said first signal supply wiring and said second signal supply wiring supplies a signal to a dummy switch provided in place of said first switch.

9. A solid state image pickup device, comprising:
a light receiving unit comprised of a plurality of pixels; and
a line memory to be constituted by a plurality of memory units for holding once signals from each of said pixels; and a readout circuit for reading out signals held by each memory unit of said line memory,
wherein said readout circuit has:
a first line memory to be, of said line memories, arranged at a predetermined place; one or more first switches connected to each memory unit of said first line memory; a first common signal line comprising a predetermined number of said first switches connected together; a second switch for connecting said first common signal line to a second common signal line; a first signal readout unit for selectively reading out signals to be held by each memory unit of said first line memory on said second common signal line via said first switch, said first common signal line, and said second switch;
second line memories to be, of said line memories, alternately arranged in places adjacent to said first line memory; third switches connected to each memory unit of said second line memory; a third common signal line comprising a predetermined number of said third switches connected together; a fourth switch for connecting said third common signal line to a fourth common signal line; a second signal readout unit for selectively reading out signals to be held by each memory unit of said second line memory on said fourth common signal line via said third switch, said third common signal line, and said fourth switch; a control unit for controlling opening/closing of said first and third switches;
first outgoing wiring provided between the electrode of said second switch and said second common signal line;
second outgoing wiring provided between the electrode of said fourth switch and said fourth common signal line; and
control wiring to be connected from said control unit to said first and third switches, wherein said control wiring is arranged at a position to become line-symmetric with respect to a center line between said first outgoing wiring and said second outgoing wiring.

10. The solid state image pickup device according to claim 9, wherein said readout circuit has further a processing unit for extracting a difference signal between output from said first signal readout unit and output from said second signal readout unit.

11. The solid state image pickup device according to claim 6, wherein said readout circuit has an odd column readout circuit connected to the line memory located at an odd column of said light receiving unit and an even column readout circuit connected to the line memory located at an even column of said light receiving unit, and said odd column readout circuit and said even column readout circuit are arranged to sandwich said light receiving unit therebetween.

12. A readout circuit, comprising:
a signal holding unit comprised of a plurality of signal holding cells;
common wiring for reading out signals from said signal holding unit; and
a partial common line to be shared by two or more of said signal holding cells,
wherein a readout cell for handling said partial common line as a unit is constituted, and said readout cell has hierarchical structure comprised of at least one or more hierarchies,
wherein said readout circuit has outgoing wiring for reading out on a common line in an upper layer from a common line in a lower layer, and control wiring adjacent to said outgoing wiring,
wherein said control wiring has first positive signal supply wiring and second signal supply wiring to which a pair of a first positive signal and a second signal anti-signal in which a logical level has been reversed with respect to each other is supplied respectively, and
wherein said first signal supply wiring and said second signal supply wiring are arranged so as to be line-symmetric with respect to said outgoing wiring.

13. A camera system comprising:
a solid state image pickup device having the readout circuit according to any one of claims 1, 4 and 12;
an optical system for focusing light on said solid state image pickup device; and
a signal processing circuit for processing an output signal from said solid state image pickup device.

14. A camera system comprising:
a solid state image pickup device according to either one of claims 6 and 9;
an optical system for focusing light on said solid state image pickup device; and
a signal processing circuit for processing an output signal from said solid state image pickup device.

* * * * *

UNITED STATES PATENT AND TRADEMARK OFFICE
CERTIFICATE OF CORRECTION

PATENT NO.       : 6,987,685 B2
APPLICATION NO.  : 10/928403
DATED            : January 17, 2006
INVENTOR(S)      : Koizumi et al.

It is certified that error appears in the above-identified patent and that said Letters Patent is hereby corrected as shown below:

COLUMN 1
Line 35, "switch)" should read --switch).--.

COLUMN 2
Line 24, "103, they are" should read --103 are--.

COLUMN 3
Line 63, "line al" should read --line a1--.

COLUMN 5
Line 26, "reversed" should read --reversed with respect to--.

COLUMN 6
Line 21, "reversed" should read --reversed with respect to--.

COLUMN 7
Line 10, "reversed" should read --reversed with respect to--.

COLUMN 8
Line 42, "every the" should read --for every--.
Line 45, "every the" should read --for every--.

COLUMN 9
Line 7, "reversed" should read --reversed with respect to--.
Line 17, "lines al" should read --lines a1--.
Line 24, "has" should read --has been--.
Line 46, "every the" should read --for every--.

COLUMN 13
Line 36, "$\Delta V_{CH}^{2}$" should read --$\Delta V_{CH\_2}$--.
Line 42, "$\Delta V_{CH}^{4}$" should read --$\Delta V4_{CH\_4}$--.
Line 61, "line cl" should read --line cl--.

COLUMN 14
Line 42, "describe" should read --described--.

UNITED STATES PATENT AND TRADEMARK OFFICE
CERTIFICATE OF CORRECTION

PATENT NO. : 6,987,685 B2
APPLICATION NO. : 10/928403
DATED : January 17, 2006
INVENTOR(S) : Koizumi et al.

It is certified that error appears in the above-identified patent and that said Letters Patent is hereby corrected as shown below:

COLUMN 19
Line 52, "first" should read --positive first--.
Line 54, "first" should read --positive first--, and "an" should be deleted.

COLUMN 21
Line 3, "first" should read --positive first--.
Line 11, "first" should read --positive first--.
Line 12, "signal" should read --signal anti-signal--.
Line 14, "first" should read --positive first--.
Line 15, "signal" (first occurrence) should read --signal anti-signal--.

COLUMN 22
Line 35, "signal" should read --signal anti-signal--.
Line 39, "first" should read --positive first--.
Line 40, "signal" should read --signal anti-signal--.

Signed and Sealed this

Twelfth Day of December, 2006

JON W. DUDAS
*Director of the United States Patent and Trademark Office*